United States Patent
Yamauchi et al.

(10) Patent No.: US 7,457,410 B2
(45) Date of Patent: Nov. 25, 2008

(54) TRANSMISSION/RECEPTION SYSTEM

(75) Inventors: Hiroki Yamauchi, Ibaraki (JP); Natsume Matsuzaki, Mino (JP); Yuusaku Ohta, Moriguchi (JP); Yuichi Futa, Osaka (JP)

(73) Assignee: Panasonic Corporation, Osaka (JP)

( * ) Notice: Subject to any disclaimer, the term of this patent is extended or adjusted under 35 U.S.C. 154(b) by 996 days.

(21) Appl. No.: 10/836,239

(22) Filed: May 3, 2004

(65) Prior Publication Data
US 2004/0250061 A1 Dec. 9, 2004

(30) Foreign Application Priority Data
May 7, 2003 (JP) .............................. 2003-129038

(51) Int. Cl.
*H04L 9/00* (2006.01)
(52) U.S. Cl. ........................................................ 380/43
(58) Field of Classification Search ........................ None
See application file for complete search history.

(56) References Cited

U.S. PATENT DOCUMENTS

| | | | |
|---|---|---|---|
| 6,324,645 B1 * | 11/2001 | Andrews et al. ............. | 713/157 |
| 2002/0170013 A1 | 11/2002 | Bolourchi et al. | |
| 2003/0026430 A1 * | 2/2003 | Aikawa et al. .............. | 380/277 |
| 2003/0046533 A1 * | 3/2003 | Olkin et al. ................. | 713/152 |

FOREIGN PATENT DOCUMENTS

| | | |
|---|---|---|
| JP | 2001-285284 | 10/2001 |
| JP | 2002-124952 | 4/2002 |
| WO | 01/11818 | 2/2001 |

OTHER PUBLICATIONS

A. J. Menezes et al., "Handbook of Applied Cryptography", Handbook of Applied Cryptography, CRC Press Series on Discrete Mathematices and ITS Applications, Boca Raton, FL, CRC Press, US, 1997, pp. 352-368.

* cited by examiner

*Primary Examiner*—Brandon S Hoffman
(74) *Attorney, Agent, or Firm*—Wenderoth, Lind & Ponack, L.L.P.

(57) ABSTRACT

A server and a client hold common secret information in respective secret information holding units. A server Cyclic Redundancy Check (CRC) unit in the server generates a CRC code after adding the secret information to communication data, and transmits the communication data with the CRC code attached. A client CRC unit of the client generates a CRC code after adding the secret information to communication data, and checks whether or not an error has occurred in the communication data on the communication path. Since the client holds the secret information, the client determines that an error has not occurred, and obtains the communication data. On the other hand, a router, which does not hold the secret information, is unable to obtain the communication data. This prevents the communication data from being transferred to devices outside an authorized domain.

19 Claims, 17 Drawing Sheets

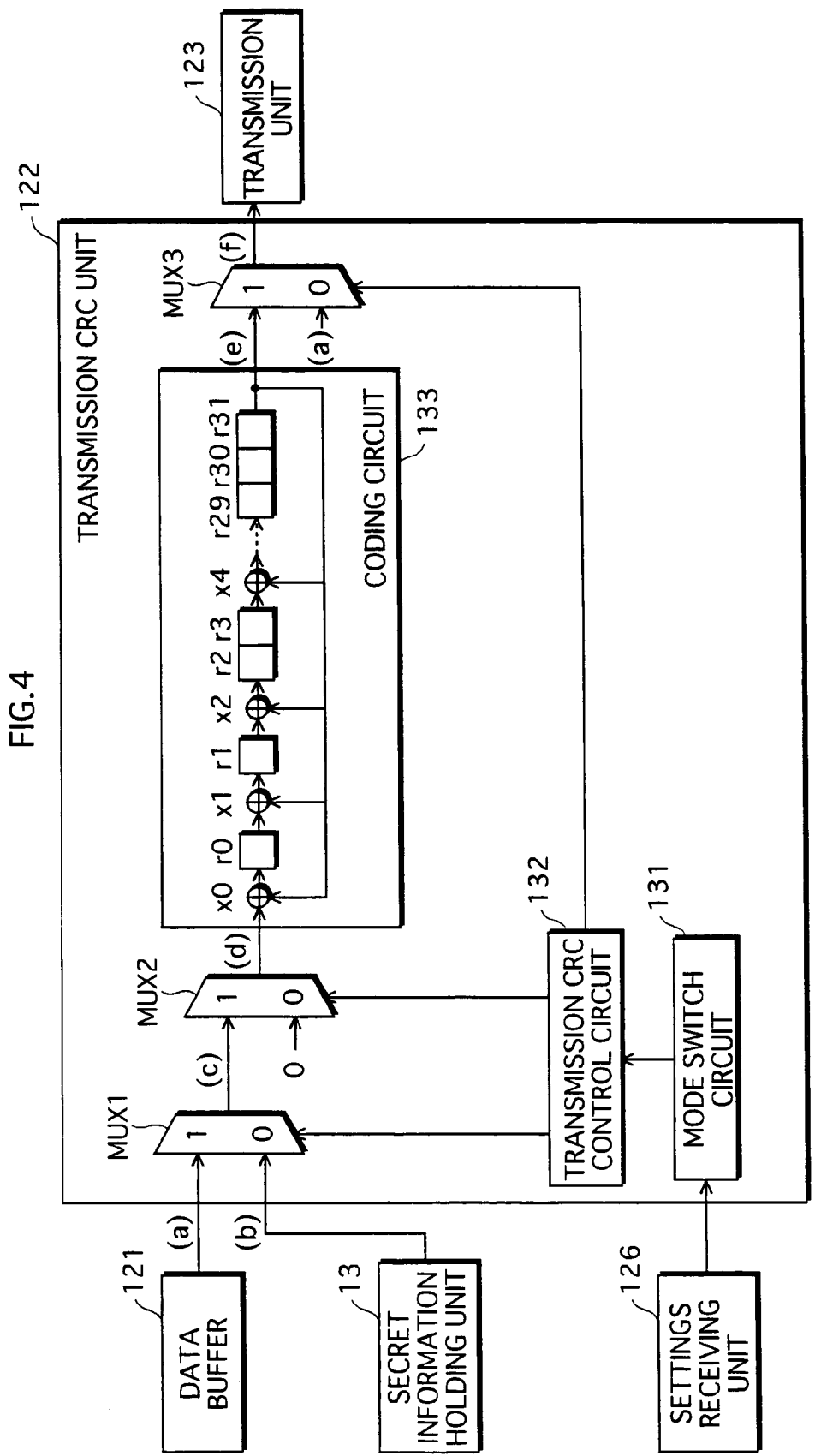

FIG.5A  DESTINATION | SOURCE | TYPE | PAYLOAD  60 - 1500 BYTES

FIG.5B  SECRET INFORMATION Ks  16 BYTES

FIG.5C  DESTINATION | SOURCE | TYPE | PAYLOAD | SECRET INFORMATION Ks

FIG.5D  DESTINATION | SOURCE | TYPE | PAYLOAD | SECRET INFORMATION Ks | 000····0  32 BITS OF NULL DATA

FIG.5E  CRC CODE  32 BITS

FIG.5F  DESTINATION | SOURCE | TYPE | PAYLOAD | CRC CODE

FIG.12

| | NETWORK ADDRESS 550 | MAC ADDRESS 551 | DEVICE TYPE 552 | PORT 553 |
|---|---|---|---|---|
| 1 | 133.1.144.0 | 08-00-16-21-5A-63 | SERVER | 1 |
| 2 | 133.1.145.0 | 01-21-38-B6-55-11 | TELEVISION | 2 |
| 3 | 133.1.145.0 | 02-C3-26-71-03-22 | GAME MACHINE | 2 |
| 4 | 133.1.144.0 | 08-00-CF-52-B1-78 | HDD RECORDER | 3 |

FIG.16

| | SUB-NET ADDRESS 690 | MAC ADDRESS 691 | DEVICE TYPE 692 | PORT 693 |
|---|---|---|---|---|
| 1 | 133.1.144.0 | 08-00-16-21-5A-63 | SERVER | 1 |
| 2 | 133.1.145.0 | 01-21-38-B6-55-11 | TELEVISION | 2 |
| 3 | 133.1.145.0 | 02-C3-26-71-03-22 | GAME MACHINE | 2 |
| 4 | | | | |

TRANSMISSION/RECEPTION SYSTEM

BACKGROUND OF THE INVENTION (1) Field of the Invention

The present invention relates to a transmission/reception system, and in particular to a technique for preventing unauthorized use of contents in contents distribution.

(2) Related Art

In recent years, home networks have started to become a reality. In such networks, devices in a home which are connected over the network share contents. One form of such a home network is one in which devices such as a server, televisions, and audio devices are connected in a star formation around a central hub. The hub is connected to a router which is the only device in the home to be connected to an external network. The server stores various contents, which it obtains from the external network via the hub and the router, and then distributes the contents to the devices in response to requests from the devices. This enables the devices to share the various contents.

However, unlimited sharing of contents is unacceptable from the point of view of rights protection. Consequently, contents that are permitted to be used only by devices in the home must be restricted so that they are not distributed to external devices. (Hereinafter, "authorized domain" (AD) is used to denote the limited range within which contents are permitted to be shared). For this reason, when the server receives a request for contents distribution from a device, it is necessary for the server to confirm that the device is within the AD, before distributing the contents to the device.

Japanese unexamined patent application publication No. 2001-285284 discloses a method that focuses on IP (Internet protocol) network addresses. In this method, a server judges whether the network address of a device that has requested distribution of contents is the same as the network address of the server, and recognizes the device as being in the AD when the network addresses are the same.

However, since network address settings can be easily changed with the user interface, a malicious user can register the AD network address in an external device. When a distribution request is received from such an external device, the server recognizes the external device as being within the AD and distributes the contents to the external device. Consequently, distribution of contents to devices outside the AD is unable to be restricted.

SUMMARY OF THE INVENTION

The object of the present invention is to provide a reception/transmission system in which distribution of contents to devices outside the AD is restricted, and in which settings cannot be changed easily.

(1) The transmission/reception apparatus of the present invention is a transmission/reception system including a transmission apparatus and a reception apparatus, the transmission apparatus including: an acquisition unit operable to acquire communication data; a transmission-side holding unit operable to hold first secret information that is identical to second secret information held by the reception apparatus; a transmission-side generation unit operable to convert the acquired communication data using the first secret information, thereby generating converted data, and apply a first predetermined code conversion to the generated converted data, thereby generating a check code; and a transmission unit operable to transmit the communication data in an unconverted state with the generated check code attached thereto, and the reception apparatus including: a reception-side holding unit operable to hold the second secret information that is identical to the first secret information held by the transmission apparatus; a reception-side reception unit operable to receive the communication data with the check code attached thereto; a reception-side generation unit operable to convert the received communication data using the second secret information, thereby generating converted data, and apply a second predetermined code conversion that is identical to the first predetermined code conversion to the generated converted data, thereby generating a check code; and a check unit operable to check whether or not an error has occurred in the communication data, by comparing the received check code with the check code generated by the reception-side generation unit.

According to the stated structure, the transmission apparatus and the reception apparatus hold common secret information, and respectively apply a predetermined code conversion to the communication data using the secret information, thereby generating respective check codes. Accordingly, the check code transmitted attached to the communication data by the transmission apparatus and the check code generated by the reception apparatus will match if no error occurs in the communication data on the communication path.

When the transmission apparatus transmits content data as the communication data, the reception apparatus obtains the content data if the check code attached to the content data and the check code generated by the reception apparatus from the content data match. If the two check codes do not match, this means that an error has occurred in the content data on the communication path, and therefore the reception apparatus judges that the content data would not be able to be used correctly and discards the content data. The reception apparatus then makes a re-transmission request to the transmission apparatus, and finally obtains content data in which an error has not occurred.

On the other hand, in another reception apparatus that does not hold secret information common with the transmission apparatus, the check code attached to the content data and a check code generated by the other reception apparatus will not match, and therefore the other reception apparatus will judge that the content data would not be able to be used correctly and discard the content data. Even if the other reception apparatus subsequently makes a re-transmission request to the transmission apparatus, the check codes will not match.

In this way, unlimited distribution of content data is restricted by the transmission apparatus and the reception apparatus holding common secret information, and using check codes generated by applying a predetermined code conversion using the secret information.

Note that a possible structure is one in which the transmission apparatus transmits authentication data as the communication data, before distributing content. Here, only a reception apparatus that holds the common secret information and is able to apply a predetermined code conversion using the secret information can obtain the authentication data. The reception apparatus transmits response data that is a response to the authentication data to the transmission apparatus.

(2) Furthermore, in addition to being operable in a first mode for converting the acquired communication data with the first secret information and generating the check code by applying the first predetermined code conversion to the converted data, the transmission-side generation unit may be operable in a second mode for generating a check code by applying the first predetermined code conversion to the communication data, may be switchable between the first mode and the second mode, and may generate the check code in either the first mode or the second mode, as predetermined for the communication data, and in addition to being operable in a first mode for converting the acquired communication data with the second secret information and generating the check code by applying the second predetermined code conversion to the converted data, the reception-side generation unit may be operable in a second mode for generating a check code by applying the second predetermined code conversion to the communication data, may be switchable between the first mode and the second mode, and may generate the check code in either the first mode or the second mode, as predetermined for the communication data.

According to the stated structure, the check code is generated in either a first mode or a second mode, and the transmission apparatus and reception apparatus select a mode predetermined for the communication data and generate the check code. The check code generated by the transmission apparatus in the first mode does not match the check code generated by the reception apparatus unless the check code generated by the reception apparatus is generated in first mode. In other words, only a specific reception apparatus that holds the secret information common by the transmission apparatus is able to obtain the communication data.

On the other hand, since the secret information is not used in the check code generated in the second mode, the communication data is not limited to being obtainable only by a specific reception apparatus when the second mode is used.

Consequently, if it is predetermined that for contents data of which distribution is restricted from being unlimited, the check code is to be generated in the first mode, and that for contents data that does not need to be restricted, the check code is generated in the second mode, it is possible to restrict distribution of only the contents data of which distribution is to be restricted from being unlimited.

(3) Furthermore, the transmission/reception system may further include a transfer apparatus that transfers the communication data with the check code attached thereto from the transmission apparatus to an external apparatus, the transfer apparatus including: a transfer-side reception unit operable to receive the communication data with the check code attached thereto transmitted by the transmission apparatus and destined for the external apparatus; a transfer-side generation unit operable to apply a third predetermined code conversion that is identical to the first code conversion to the received communication data, thereby generating a check code; and a check unit operable to judge whether or not the check code generated by the transfer-side generation unit and the check code received by the transmission-side reception unit are identical, and when the two check codes are judged to be identical, transfer the communication data, and when the two check codes are judged not to be identical, discard the communication data.

According to the stated structure, on receiving communication data destined for an external apparatus, the transfer apparatus transfers the communication data if the check code attached to the communication data and the check code generated by the transfer apparatus from the communication data match, and does not transfer the communication data if the two check codes do not match. Here, since the transfer apparatus only operates in the second mode that applies the predetermined code conversion to the communication data, the transfer apparatus does not transfer communication data that has a check code generated in the first mode attached thereto.

Consequently, the content data for which it has been determined that the check code is generated in the first mode can be prevented from being transferred to an external apparatus.

(4) Furthermore, the transmission apparatus of the present invention is a transmission apparatus for transmitting communication to a reception apparatus, including: an acquisition unit operable to acquire communication data; a holding unit operable to hold secret information in common with the reception apparatus; a code generation unit operable to convert the acquired communication data using the secret information, thereby generating converted data, and apply a predetermined code conversion to the generated converted data, thereby generating a check code; and a transmission unit operable to transmit the communication data in an unconverted state with the generated check code attached thereto to the reception apparatus.

According to the stated structure, the transmission apparatus holds secret information common with the reception apparatus, and applies a predetermined code conversion to the communication data using the secret information, thereby generating a check code. If the reception apparatus has a similar structure of generating a check code by applying a predetermined code conversion to the communication data using the secret information, the check code transmitted attached to the communication data by the transmission apparatus and the check code generated by the reception apparatus will match if no error occurs in the communication data on the communication path.

When the transmission apparatus transmits content data as the communication data, the reception apparatus obtains the content data if the check code attached to the content data and the check code generated by the reception apparatus from the content data match. If the two check codes do not match, this means that an error has occurred in the content data on the communication path, and therefore the reception apparatus judges that the content data would not be able to be used correctly and discards the content data. The reception apparatus then makes a re-transmission request to the transmission apparatus, and finally obtains content data in which an error has not occurred.

On the other hand, in another reception apparatus that does not hold secret information common with the transmission apparatus, the check code attached to the content data and a check code generated by the other reception apparatus will not match, and therefore the other reception apparatus will judge that the content data would not be able to be used correctly and discards the content data. Even if the other reception apparatus subsequently makes a re-transmission request, the check codes will not match.

In this way, unlimited distribution of content data is restricted by the transmission apparatus holding secret information that is common with the reception apparatus, and by using check codes generated by applying a predetermined code conversion using the secret information.

Note that a possible structure is one in which the transmission apparatus transmits authentication data as the communication data, before distributing contents. This structure is as described for when the content data is transmitted as the communication data.

(5) Furthermore, in addition to being operable in a first mode for converting the acquired communication data with the secret information and generating the check code by applying the predetermined code conversion to the converted data, the code generation unit may be operable in a second mode for generating a check code by applying a predetermined code conversion to the communication data, and may be switchable between the first mode and the second mode, and the code generation unit may select which of the first mode and the second the transmission-side generation unit to generate the check code in according to a predetermined criterion.

According to the stated structure, the check code may be generated in either the first mode or the second mode, and the transmission apparatus generates the check code in a mode selected based on a predetermined criterion. The check code generated by the transmission apparatus in the first mode does not match the check code generated by the reception apparatus if the check code generated by the reception apparatus is not generated in the first mode. In other words, only a specific reception apparatus that holds the secret information common with the transmission apparatus is able to obtain the communication data.

On the other hand, since the secret information is not used in the check code generated in the second mode, the communication data is not limited to being obtainable only by a specific reception apparatus when the second mode is used.

(6) Furthermore, the code generation unit may select the one of the first mode and the second mode predetermined for the communication data, as the predetermined criterion.

According to the stated structure, the first mode or the second mode is selected individually for the particular communication data.

Consequently, if it is predetermined that for contents data of which distribution is restricted from being unlimited, the check code is to be generated in the first mode, and that for contents data that does not need to be restricted, the check code is generated in the second mode, it is possible to restrict distribution of only the contents data of which distribution is to be restricted from being unlimited.

(7) Furthermore, the predetermined code conversion may a code conversion according to one of a cyclic redundancy check, a hash function, and a check sum.

These code conversions can be realized by hardware, and are therefore difficult for a malicious user to modify.

(8) The integrated circuit of the present invention is an integrated circuit for transmitting communication data to a reception apparatus, including: an acquisition unit operable to acquire communication data; a holding unit operable to hold secret information in common with the reception apparatus; a code generation unit operable to convert the acquired communication data using the secret information, thereby generating converted data, and apply a predetermined code conversion to the generated converted data, thereby generating a check code; and a transmission unit operable to transmit the communication data in an unconverted state with the generated check code attached thereto to the reception apparatus.

According to the stated structure, the integrated circuit holds secret information common with the reception apparatus, and applies a predetermined code conversion to the communication data using the secret information, thereby generating a check code. If the reception apparatus has a similar structure of generating a check code by applying a predetermined code conversion to the communication data using the secret information, the check code transmitted attached to the communication data by the integrated circuit and the check code generated by the reception apparatus will match if no error occurs in the communication data on the communication path.

When the integrated circuit transmits content data as the communication data, the reception apparatus obtains the content data if the check code attached to the content data and the check code generated by the reception apparatus from the content data match. If the two check codes do not match, this means that an error has occurred in the content data on the communication path, and therefore the reception apparatus judges that the content data would not be able to be used correctly and discards the content data. The reception apparatus then makes a re-transmission request to the integrated circuit, and finally obtains content data in which an error has not occurred.

On the other hand, in another reception apparatus that does not hold secret information common with the integrated circuit, the check code attached to the content data and a check code generated by the other reception apparatus will not match, and therefore the other reception apparatus will judge that the content data would not be able to be used correctly and discards the content data. Even if the other reception apparatus subsequently makes a re-transmission request to the integrated circuit, the check codes will not match.

In this way, unlimited distribution of content data is restricted by the integrated circuit holding secret information that is common with the reception apparatus, and by using a check codes generated by applying a predetermined code conversion using the secret information.

Note that a possible structure is one in which the integrated circuit transmits authentication data as the communication data, before distributing contents. This structure is as described for when the content data is transmitted as the communication data.

(9) The reception apparatus of the present invention is a reception apparatus that receives communication data from a transmission apparatus, including: a holding unit operable to hold secret information in common with the transmission apparatus; a reception unit operable to receive the communication data with a check code attached thereto; a code generation unit operable to convert the received communication data using the secret information, thereby generating converted data, and apply the predetermined code conversion to the generated converted data, thereby generating a check code; and a check unit operable to check whether or not an error has occurred in the communication data, by comparing the received check code with the generated check code generated.

According to the stated structure, the reception apparatus holds secret information common with the transmission apparatus, and applies a predetermined code conversion to the communication data using the secret information, thereby generating a check code. If the transmission apparatus has a similar structure of generating a check code by applying a predetermined code conversion to the communication data using the secret information, the check code transmitted attached to the communication data by the transmission apparatus and the check code generated by the reception apparatus will match if no error occurs in the communication data on the communication path.

When the transmission apparatus transmits content data as the communication data, the reception apparatus obtains the content data if the check code attached to the content data and the check code generated by the reception apparatus from the content data match. If the two check codes do not match, this means that an error has occurred in the content data on the communication path, and therefore the reception apparatus judges that the content data would not be able to be used correctly and discards the content data. The reception apparatus then makes a re-transmission request to the transmission apparatus, and finally obtains content data in which an error has not occurred.

On the other hand, in another reception apparatus that does not hold secret information common with the transmission apparatus, the check code attached to the content data and a check code generated by the other reception apparatus will not match, and therefore the other reception apparatus will judge that the content data would not be able to be used correctly and discards the content data. Even if the other reception apparatus subsequently makes a re-transmission request to the transmission apparatus, the check codes will not match.

In this way, unlimited distribution of content data is restricted by the reception apparatus holding secret information that is common with the transmission apparatus, and using a check codes generated by applying a predetermined code conversion using the secret information.

Note that a possible structure is one in which the transmission apparatus transmits authentication data as the communication data, before distributing contents. This structure is as described for when the content data is transmitted as the communication data.

(10) Furthermore, in addition to being operable in a first mode for converting the acquired communication data with the secret information and generating the check code by applying the predetermined code conversion to the converted data, the code generation unit may be operable in a second mode for generating a check code by applying a predetermined code conversion to the communication data, and may be switchable between the first mode and the second mode, and the code generation unit may select which of the first mode and the second the transmission-side generation unit to generate the check code in according to a predetermined criterion.

According to the stated structure, the check code may be generated in either the first mode or the second mode, and the reception apparatus generates the check code in a mode selected based on a predetermined criterion. The check code generated by the reception apparatus in the first mode does not match the check code generated by the transmission apparatus if the check code generated by the transmission apparatus is not generated in the first mode. In other words, only a specific reception apparatus that holds the secret information common with the transmission apparatus is able to obtain the communication data.

On the other hand, since the secret information is not used in the check code generated in the second mode, the communication data is not limited to being obtainable only by a specific reception apparatus when the second mode is used.

(11) Furthermore, the code generation unit may select the one of the first mode and the second mode predetermined for the communication data, as the predetermined criterion.

According to the stated structure, the first mode or the second mode is selected individually for the particular communication data.

Consequently, if it is predetermined that for contents data of which distribution is restricted from being unlimited, the check code is to be generated in the first mode, and that for contents data that does not need to be restricted, the check code is generated in the second mode, it is possible to restrict distribution of only the contents data of which distribution is to be restricted from being unlimited.

(12) Furthermore, the predetermined code conversion may be a code conversion according to one of a cyclic redundancy check, a hash function, and a check sum.

These code conversions can be realized by hardware, and are therefore difficult for a malicious user to modify.

(13) The integrated circuit of the present invention is an integrated circuit for receiving communication data from a transmission apparatus, including: a holding unit operable to hold secret information in common with the transmission apparatus; a reception unit operable to receive the communication data with a check code attached thereto; a code generation unit operable to convert the received communication data using the secret information, thereby generating converted data, and apply the predetermined code conversion to the generated converted data, thereby generating a check code; and a check unit operable to check whether or not an error has occurred in the communication data, by comparing the received check code with the generated check code generated.

According to the stated structure, the integrated circuit holds secret information common with the transmission apparatus, and applies a predetermined code conversion to the communication data using the secret information, thereby generating a check code. If the transmission apparatus has a similar structure of generating a check code by applying a predetermined code conversion to the communication data using the secret information, the check code transmitted attached to the communication data by the transmission apparatus and the check code generated by the integrated circuit will match if no error occurs in the communication data on the communication path.

When the transmission apparatus transmits content data as the communication data, the integrated circuit obtains the content data if the check code attached to the content data and the check code generated by the integrated circuit from the content data match. If the two check codes do not match, this means that an error has occurred in the content data on the communication path, and therefore the integrated circuit judges that the content data would not be able to be used correctly and discards the content data. The integrated circuit then makes a re-transmission request to the transmission apparatus, and finally obtains content data in which an error has not occurred.

On the other hand, in another integrated circuit that does not hold secret information common with the transmission apparatus, the check code attached to the content data and a check code generated by the other integrated circuit will not match, and therefore the other integrated circuit will judge that the content data would not be able to be used correctly and discard the content data. Even if the other integrated circuit subsequently makes a re-transmission request to the transmission apparatus, the check codes will not match.

In this way, unlimited distribution of content data is restricted by the integrated circuit holding secret information that is common with the transmission apparatus, and using a check codes generated by applying a predetermined code conversion using the secret information.

Note that a possible structure is one in which the transmission apparatus transmits authentication data as the communication data, before distributing contents. This structure is as described for when the content data is transmitted as the communication data.

(14) The transfer apparatus of the present invention is a transfer apparatus for transferring communication data with a check code attached thereto, including: a storage unit operable to store identification information about a predetermined reception apparatus; a reception unit operable to receive the communication data with the check code attached thereto transmitted by a transmission apparatus and destined for a reception apparatus; and a transfer unit operable to judge, based on the identification information, whether an error check is to be performed on the received communication data, and when an error check is to be performed, perform the error check using the check code and, if an error is not found in the communication data, transfer the communication data to the reception apparatus, and when an error check is not to be performed, transfer the communication data to the reception apparatus without performing the error check.

According to the stated structure, the transfer apparatus receives communication data transmitted by the transmission apparatus and destined for a reception apparatus, and transfers communication data without performing error detection if the communication data is destined for a predetermined reception apparatus.

Accordingly, in a case in which the transmission apparatus transmits the communication data with a special check code attached thereto by which only a predetermined reception apparatus recognizes that an error has not occurred in the communication data, a situation in which, on receiving the communication data, the transfer apparatus recognizes an error to have occurred and does not transfer the communication data can be avoided.

(15) Furthermore, the transfer unit may include: a code generation sub-unit operable, when an error check is to be performed, to apply a predetermined code conversion to the communication data, thereby generating a check code; and a check sub-unit operable to judge whether or not the generated check code and the received check code are identical, and when the check codes are judged to be identical, transfer the communication data, and when the check codes are judged not to be identical, discard the communication data.

According to the stated structure, in a case in which the transmission apparatus holds secret information common with the reception apparatus, generates the check code by applying a predetermined conversion code to the communication data using the secret information and transmits the check code attached to the communication data, a situation in which, on receiving the communication data, the transfer apparatus recognizes an error to have occurred and does not transfer the communication data can be avoided.

(16) The integrated circuit of the present invention is an integrated circuit for transferring communication data with a check code attached thereto, including: a storage unit operable to store identification information about a predetermined reception apparatus; a reception unit operable to receive the communication data with the check code attached thereto transmitted by a transmission apparatus and destined for a reception apparatus; and a transfer unit operable to judge, based on the identification information, whether an error check is to be performed on the received communication data, and when an error check is to be performed, perform the error check using the check code and, if an error is not found in the communication data, transfer the communication data to the reception apparatus, and when an error check is not to be performed, transfer the communication data to the reception apparatus without performing the error check.

According to the stated structure, the integrated circuit receives communication data transmitted by the transmission apparatus and destined for a reception apparatus, and transfers the communication data without performing error detection if the communication is destined for a predetermined reception apparatus.

Accordingly, in a case in which the transmission apparatus transmits the communication data with a special check code attached thereto by which only a predetermined reception apparatus recognizes that an error has not occurred in the communication data, a situation in which, on receiving the communication data, the integrated circuit recognizes an error to have occurred and does not transfer the communication data can be avoided.

(17) The transfer apparatus of the present invention is a transfer apparatus for transferring communication data with a check code attached thereto, including: a holding unit operable to hold secret information in common with the transmission apparatus; a storage unit operable to a storage unit operable to store identification information about a predetermined reception apparatus; a reception unit operable to receive the communication data with the check code attached thereto transmitted by a transmission apparatus and destined for a reception apparatus; a code generation unit operable to convert the received communication data using the secret information, thereby generating converted data, and apply the predetermined code conversion to the generated converted data, thereby generating a check code; a check unit operable to check whether or not an error has occurred in the communication data, by comparing the received check code with the generated check code; a transfer judgment unit operable to judge, based on the identification information, whether or not the communication data is permitted to be transferred; and a transfer unit operable to transfer the communication data when the check unit determines that an error has not occurred and the transfer judgment unit has judged that the communication data is permitted to be transferred.

According to the stated structure, the transfer apparatus holds secret information common with the transmission apparatus, and applies a predetermined code conversion to the communication data using the secret information, thereby generating a check code. If the transmission apparatus has a similar structure of generating a check code by applying a predetermined code conversion to the communication data using the secret information, the check code transmitted attached to the communication data by the transmission apparatus and the check code generated by the transfer apparatus will match if no error occurs in the communication data on the communication path.

Furthermore, if the check codes match, the transfer apparatus transfers communication data destined for a predetermined reception apparatus only.

Accordingly, the transfer apparatus performs error detection for communication data from the transmission apparatus, and transfers communication data only to a predetermined reception apparatus.

(18) Furthermore, the holding unit may further hold secret information in common with the reception apparatus, and the transfer unit may convert the communication data using the secret information in common with the reception apparatus, thereby generating converted data, apply a predetermined code conversion to the converted data, thereby generating a check code, and transfer the communication data with the generated check code attached thereto to the reception apparatus.

According to the stated structure, the transfer apparatus holds secret information common with the reception apparatus, and applies a predetermined code conversion to the communication data using the secret information, thereby generating a check code. If the reception apparatus has a similar structure of generating a check code by applying a predetermined code conversion to the communication data using the secret information, the check code transmitted attached to the communication data by the reception apparatus and the check code generated by the transfer apparatus will match if no error occurs in the communication data on the communication path.

Accordingly, the transmission apparatus attaches to communication data for a predetermined reception apparatus a check code by which only the predetermined reception apparatus recognizes that an error has not occurred on the communication path.

(19) The integrated circuit of the present invention is an integrated circuit for transferring communication data with a check code attached thereto, including: a holding unit operable to hold secret information in common with the transmission apparatus; a storage unit operable to a storage unit operable to store identification information about a predetermined reception apparatus; a reception unit operable to receive the communication data with the check code attached thereto transmitted by a transmission apparatus and destined for a reception apparatus; a code generation unit operable to convert the received communication data using the secret information, thereby generating converted data, and apply the predetermined code conversion to the generated converted data, thereby generating a check code; a check unit operable to check whether or not an error has occurred in the communication data, by comparing the received check code with the generated check code; a transfer judgment unit operable to judge, based on the identification information, whether or not the communication data is permitted to be transferred; and a transfer unit operable to transfer the communication data when the check unit determines that an error has not occurred and the transfer judgment unit has judged that the communication data is permitted to be transferred.

According to the stated structure, the integrated circuit holds secret information common with the transmission apparatus, and applies a predetermined code conversion to the communication data using the secret information, thereby generating a check code. If the transmission apparatus has a similar structure of generating a check code by applying a predetermined code conversion to the communication data using the secret information, the check code transmitted attached to the communication data by the transmission apparatus and the check code generated by the integrated circuit will match if no error occurs in the communication data on the communication path.

Furthermore, if the check codes match, the integrated circuit transfers communication data destined for a predetermined reception apparatus only.

Accordingly, the integrated circuit performs error detection for communication data from the transmission apparatus, and transfers communication data only to the predetermined reception apparatus.

(20) The content distribution system of the present invention is a contents distribution system including a contents distribution apparatus and a contents usage apparatus, the contents distribution apparatus including: a distribution-side holding unit operable to hold first secret information that is identical to second secret information held by the contents usage apparatus; a distribution-side generation unit operable to convert request data using the first secret information, thereby generating converted data, and apply a first predetermined code conversion to the generated converted data, thereby generating a check code, the request data being for requesting the contents usage apparatus to transmit response data; a transmission unit operable to transmit the request data in an unconverted state with the generated check code attached thereto; and a distribution unit operable to, when the response data is received from the contents usage apparatus, distribute contents to the contents usage apparatus, and the contents usage apparatus including: a usage-side holding unit operable to hold the second secret information that is identical to the first secret information held by the contents distribution apparatus; a reception unit operable to receive the request data with the check code attached thereto; a usage-side generation unit operable to convert the received request data using the second secret information, thereby generating converted data, and apply a second predetermined code conversion that is identical to the first predetermined code conversion to the generated converted data, thereby generating a check code; a check unit operable to check whether or not an error has occurred in the request data, by comparing the received check code with the check code generated by the usage-side generation unit; and a response unit operable to, when the check unit has determined that an error has not occurred, decode the request data, and transmit response data to the contents distribution apparatus.

According to the stated structure, the contents distribution apparatus holds secret information common with the contents usage apparatus, and applies a predetermined code conversion to the request data using the secret information, thereby generating a check code.

Furthermore, the contents usage apparatus holds secret information common with the contents distribution apparatus, and applies a predetermined code conversion to the request data using the secret information, thereby generating a check code.

Accordingly, the check code transmitted attached to the request data by the contents distribution apparatus and the check code generated by the contents usage apparatus based on the request data will match if no error occurs in the request data on the communication path.

If the contents usage apparatus judges that an error has not occurred in the request data, it decodes the request data, and transmits response data to the contents distribution apparatus. If the contents distribution apparatus receives response data, it distributes the contents to the contents usage apparatus. In this way, the contents usage apparatus is able to receive distribution of the contents from the contents distribution apparatus.

On the other hand, in another contents usage apparatus that does not hold secret information common with the contents distribution apparatus, the check code attached to the content data and a check code generated by the other contents usage apparatus will not match, and therefore the other contents usage apparatus will judge that the content data would not be able to be used correctly and discards the content data. Even if the other contents usage apparatus subsequently makes a re-transmission request to the contents distribution apparatus, the check codes will not match.

In this way, unlimited distribution of content data is restricted by the contents distribution apparatus and the contents usage apparatus holding common secret information, and using check codes generated by applying a predetermined code conversion using the secret information.

(21) The contents distribution apparatus of the present invention is a contents distribution apparatus for distributing contents to a contents usage apparatus, including: a holding unit operable to hold secret information in common with the contents usage apparatus; a code generation unit operable to convert request data using the secret information, thereby generating converted data, and apply a predetermined code conversion to the generated converted data, thereby generating a check code, the request data being for requesting the contents usage apparatus to transmit response data a transmission unit operable to transmit the request data in an unconverted state with the generated check code attached thereto; and a distribution unit operable to distribute contents to the contents usage apparatus, when response data is received from the contents usage apparatus that has received the transmitted request data and judged, using the check code, that an error has not occurred in the request data.

According to the stated structure, the contents distribution apparatus holds secret information common with the contents usage apparatus, and applies a predetermined code conversion to the request data using the secret information, thereby generating a check code. Here, if the contents usage apparatus has a structure of generating a check code by applying a predetermined code conversion to the request data using the secret information, the check code transmitted attached to the request data by the contents distribution apparatus and the check code generated by the contents usage apparatus based on the request data will match if no error occurs in the request data on the communication path. Furthermore, the contents usage apparatus will obtain and decode the request data, and transmits response data to the contents distribution apparatus.

If the contents distribution apparatus receives response data, it distributes the contents to the contents usage apparatus.

On the other hand, in another contents usage apparatus that does not hold secret information common with the contents distribution apparatus, the check code attached to the content data and a check code generated by the other contents usage apparatus will not match, and therefore the other contents usage apparatus will judge that the content data would not be able to be used correctly and discards the content data. In other words, the other contents usage apparatus will not transmit response data. Therefore, the contents distribution apparatus does not receive reception data and does not distribute contents.

In this way, unlimited distribution of content data is restricted by the contents distribution apparatus and the contents usage apparatus holding common secret information, and using check codes generated by applying a predetermined code conversion using the secret information.

(22) Furthermore, the response data may have a detection code attached thereto that has been generated in the contents usage apparatus by converting the response data using the secret information, thereby generating converted data, and applying a predetermined code conversion to the converted data, and the distribution unit may receive the response data, and judge whether or not an error has occurred in the response data by converting the response data using the secret information, thereby generating converted data, applying the predetermined code conversion to the converted data, thereby generating a check code, and comparing the attached check code with the generated check code, and distributes the contents when an error is judged not to have occurred.

According to the stated structure, a check code generated by applying the same code conversion used for the request data is attached to the response data, and the contents distribution apparatus judges whether or not the check code attached to the response data matches the check code generated by the contents distribution apparatus for the request data.

In this way, check codes generated using the secret information are used twice, i.e. for the request data and the response data, and therefore authentication processing is more reliable.

(23) The contents usage apparatus of the present invention is a contents usage apparatus for receiving distribution of contents from a contents distribution apparatus, including: a holding unit operable to hold secret information in common with the contents distribution apparatus; a reception unit operable to receive request data that has a check code attached thereto and has been transmitted by the contents distribution apparatus, the request data being for requesting transmission of response data; a code generation unit operable to convert the received response data using the secret information, thereby generating converted data, and applying a predetermined code conversion to the converted data, thereby generating a check code; a check unit operable to check whether or not an error has occurred in the request data by comparing the received check code with the generated check code; and a response unit operable to, when the check unit determines that an error has not occurred, decode the request data and transmit the response data to the contents distribution apparatus.

According to the stated structure, the contents usage apparatus holds secret information common with the contents distribution apparatus, and applies a predetermined code conversion to the request data using the secret information, thereby generating a check code. Here, if the contents distribution apparatus has a structure of generating a check code by applying a predetermined code conversion to the request data using the secret information, the check code transmitted attached to the request data by the contents distribution apparatus and the check code generated by the contents usage apparatus based on the request data will match if no error occurs in the request data on the communication path.

If the check codes match, the contents usage apparatus obtains and decodes the request data, and transmits response data to the contents distribution apparatus.

On the other hand, in another contents usage apparatus that does not hold secret information common with the contents distribution apparatus, the check code attached to the content data and a check code generated by the other contents usage apparatus will not match, and therefore the other contents usage apparatus will judge that the content data would not be able to be used correctly and discards the content data. Even if the other contents usage apparatus makes a re-transmission request to the contents distribution apparatus, the check codes will not match.

In this way, unlimited distribution of content data is restricted by the contents distribution apparatus and the contents usage apparatus holding common secret information, and using check codes generated by applying a predetermined code conversion using the secret information.

(24) Furthermore, the response unit may convert the response data using the secret information, thereby generating converted data, apply the predetermined code conversion to the converted data, thereby generating a check code, and transmit the response data in an unconverted state with the check code attached thereto.

According to the stated structure, the contents usage apparatus receives response data that has a check code attached that is the same kind of check code as that attached to the request information.

In this way, check codes generated using the secret information are used twice, i.e. for the request data and the response data, and therefore authentication processing is more reliable.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 4 shows the structure of a transmission CRC unit;

FIG. 5 shows the data configuration of (a) to (f) in FIG. 4;

FIG. 12 shows an example of an external distribution permission list;

FIG. 16 shows an example of an authenticated device list; and

DESCRIPTION OF THE PREFERRED EMBODIMENTS

The following describes of embodiments of the present invention in detail with use of the drawings.

First Embodiment

<Overview>

Figure 1:
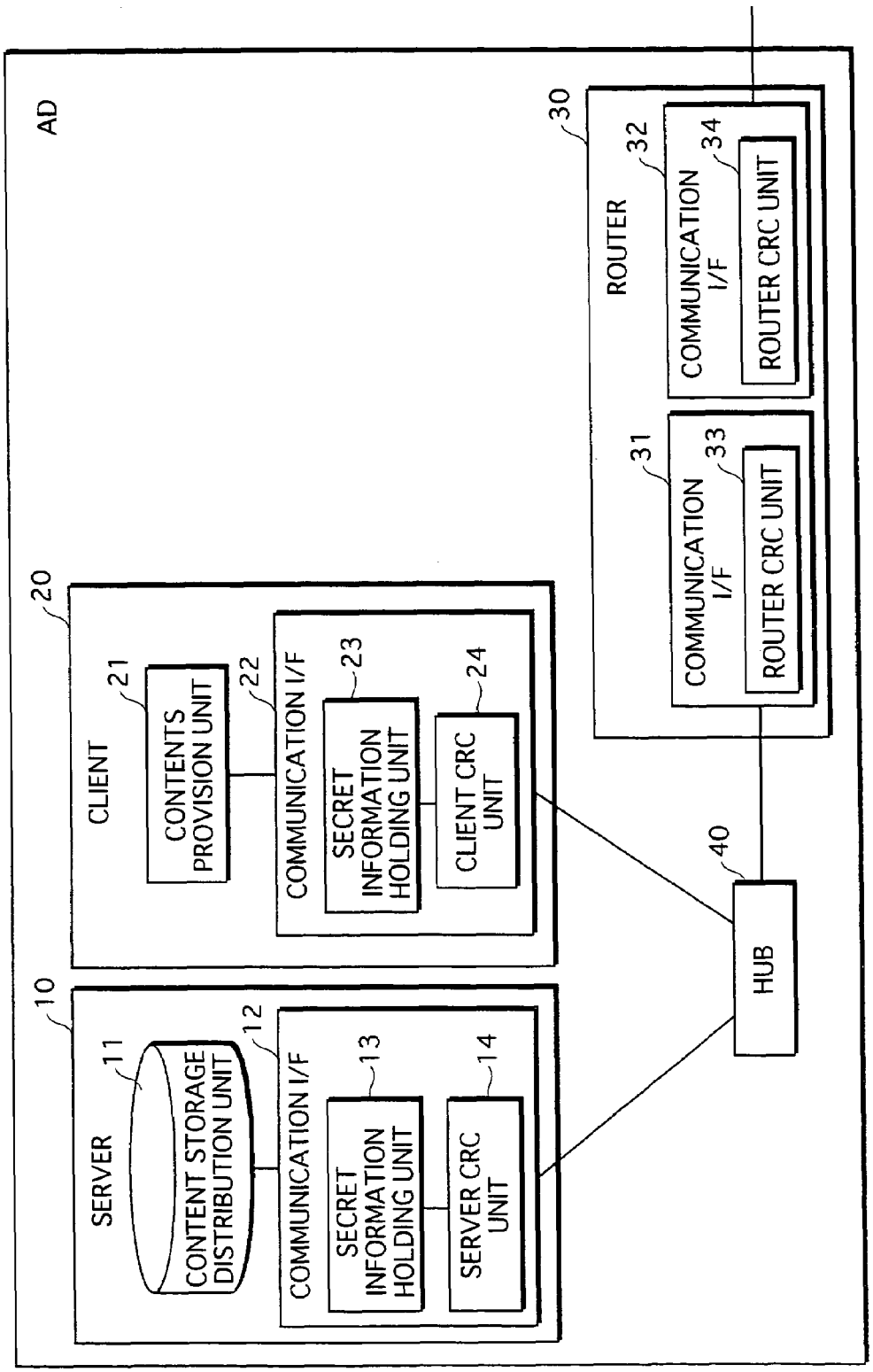
FIG. 1 shows an overview of an AD of the first embodiment.

FIG. 1 shows an overview of the AD of the first embodiment.

The AD includes a server 10, a client 20, a router 30 and a hub 40, the server 10 and the client 20 being connected in a star formation around the hub 40. Note that clients other than the client 20 are also connected to the hub 40, but are omitted from the drawing. Furthermore, it is assumed that the hub 40 does not perform Cyclic Redundancy Check (CRC) code error detection.

The router 30 is the only device in the AD network that is connected to a network outside the AD (hereinafter, also referred to as an external network). The server 10 obtains contents from the external network via the router 30, and stores the contents in a content storage distribution unit 11. When a content distribution request is received from the client 20, the server 10 first confirms, according to authentication processing, that the client 20 is a device in the AD, and then distributes the content to the client 20. The distributed content is provided to the user by a content provision unit 21 of the client 20.

The present embodiment is characterized in that a CRC code is used in the authentication processing. A CRC code is information located at the end of a data link layer packet (hereinafter called a frame), for detecting that an error has occurred in the actual data to be communicated (hereinafter called communication data) on a communication path between two proximate terminals. In other words, a frame consists of communication data with a CRC code attached thereto. Ordinarily, error detection with a CRC code is executed in the following manner.

(1) The transmission terminal divides communication data that is to be subject to error detection by a generator polynomial, and uses the remainder as the CRC code. The transmission terminal attaches the calculated CRC code to the communication data and transmits the communication data with the CRC code to a reception terminal.

(2) The reception terminal divides the communication data with the CRC code attached thereto with a generator polynomial, and finds the remainder. The remainder has a property of having a value 0 if an error does not occur on the communication path in a frame consisting of communication data and a CRC code, and a value other than 0 if an error does occur.

(3) If the value of the remainder is 0, the reception terminal judges that an error has not occurred on the communication path, and obtains the communication data. If the value of the remainder is anything other than 0, the reception terminal judges that an error has occurred on the communication path, and discards the communication data.

In the present embodiment, the transmission terminal and the reception terminal share secret information before (1), and the transmission terminal adds the secret information to the communication data to calculate the CRC code in (1). The reception terminal inserts the secret information to calculate the remainder in (2).

The following is a specific example of authentication processing in FIG. 1.

The server 10 and the client 20 share secret information Ks in a secret information storage unit 13 and a secret information storage unit 23. In a server CRC unit 14, the server 10 calculates a CRC code after adding the secret information Ks to the authentication data, and transmits the calculated CRC code to the client 20 attached to the end of the authentication data.

The client 20 receives the authentication data with the CRC code attached thereto, inserts the secret information Ks therein, and calculates the value of the remainder. If an error has not occurred on the communication path, the value of the remainder calculated in this way will be 0, and therefore the client 20 is able to receive the authentication data.

After receiving the authentication data, the client 20 transmits response data indicating that the authentication data has been correctly received to the server 10.

Having received the response data, the server 10 recognizes that the client 20 is a device in the AD, and ends the authentication processing.

In this way, since a communication interface 12 of the server 10 and a communication interface 22 of the client 20 both use special CRC processing that adds the secret information Ks to calculate the CRC code, the authentication data can be transmitted and received.

On the other hand, the router 30 does not have the function of sharing the secret information in the communication interfaces 31 and 32 and performing special CRC processing. Consequently, even if the router 30 receives the authentication data with the special CRC code attached thereto, it performs normal CRC processing. Therefore, the router 30 obtains a value other than 0 as the remainder, and judges that an error has occurred in the authentication data on the communication path and discards the data.

This means that clients outside the AD are not authenticated by the server 10 because authentication data transmitted by the server 10 is discarded by the router 30 when being relayed therethrough.

Furthermore, the CRC code is calculated by a coding circuit that is composed of exclusive or elements and shift registers. Since the coding circuit is normally provided in an integrated circuit in the communication interface, it is not easily tampered with by the user.

Consequently, the present embodiment prevents a situation in which the server 10 or the router 30 is altered by the user and contents are distributed to clients outside the AD.

<Structure>

The following describes the structure of the server and client of the present embodiment.

Figure 2:
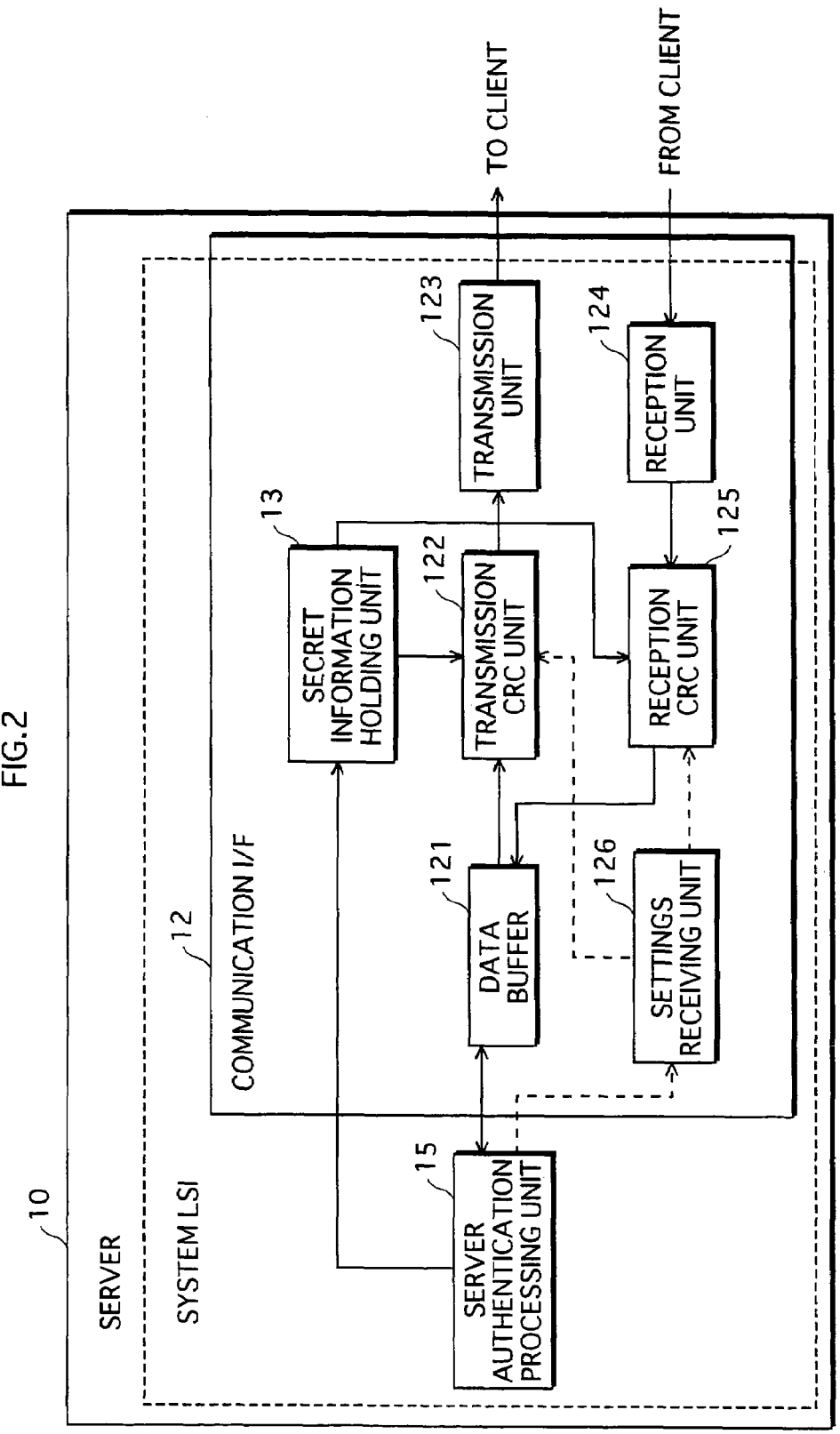
FIG. 2 shows the structure of a server when performing authentication processing.

FIG. 2 shows the structure of the server when performing authentication processing.

Figure 3:
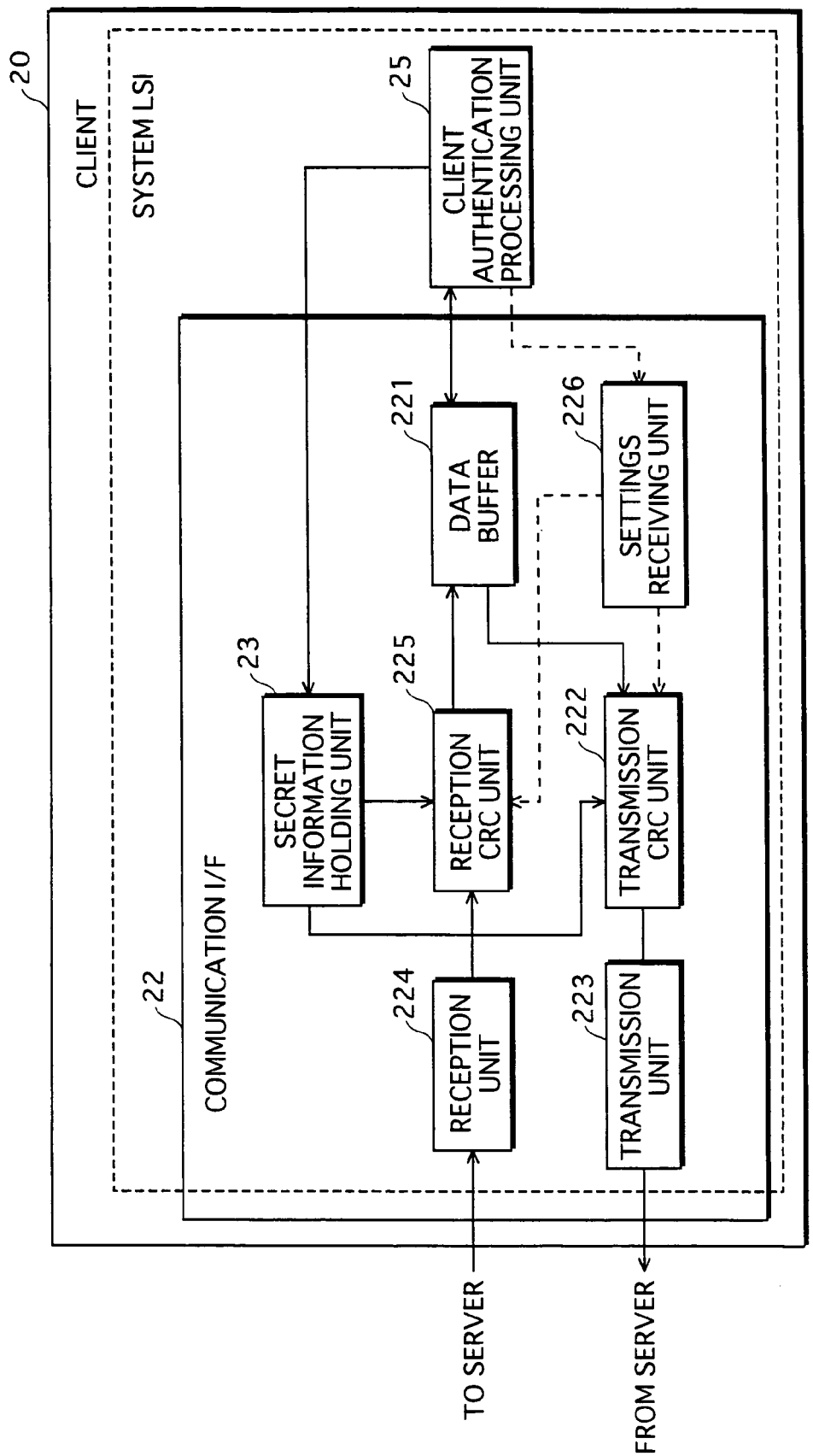
FIG. 3 shows the structure of a client when performing authentication processing.

Furthermore, FIG. 3 shows the structure of the client when performing authentication processing.

The server 10 has a server authentication processing unit 15 and a communication interface 12. The communication interface 12 includes the secret information holding unit 13, a data buffer 121, a transmission CRC unit 122, a transmission unit 123, a reception unit 124, a reception CRC unit 125, and a settings receiving unit 126.

The client 20 has a client authentication processing unit 25 and a communication interface 22 which has an internal structure identical to that of the communication interface 12 of the server 10. Note that the transmission CRC unit 122 and the reception CRC unit 125 correspond to the server CRC unit 14 of FIG. 1, and the transmission CRC unit 222 and the reception CRC unit 225 correspond to the client CRC unit 24 of FIG. 1.

The communication interface 12 is set to either special CRC mode or normal CRC mode when transmitting communication data. Special CRC mode is a mode in which the transmission CRC unit 122 and the reception CRC unit 125 perform CRC processing after attaching secret information Ks to the communication data. Normal CRC mode is a mode in which the transmission CRC unit 122 and the reception CRC unit 125 perform CRC processing without attaching secret information Ks to transmission data. The communication interface 12 switches between the modes by the settings reception unit 126 receiving an instruction from the server authentication processing unit 15. Specifically, the instruction is either a special CRC command for setting the special CRC mode or a normal CRC command for setting the normal CRC mode.

Note that in contents distribution processing, the content storage distribution unit 11 instructs the communication interface 12 to switch to the one of the modes determined for the particular contents.

The following describes a simple example of each of normal CRC mode and special CRC mode.

<Premise>

The bit series notation of the communication data (5 bits) which is subject to CRC processing is (10110).

The generator polynomial used in this example is $G(X)=X^3+X^2+1$. In this case the generator polynomial bit series notation is (1101). The CRC code will be three bits if this generator polynomial is used.

The bit series notation of the secret information (three bits) is (110).

<Transmission Processing in Normal CRC Mode>

(1) Null data (000) having the same number of bits as the CRC code (i.e., 3 bits) is attached to the ends of the communication data (10110), thereby generating calculation data (10110000).

(2) The calculation data (10110000) is divided by the generator polynomial (1101), and the remainder found. This remainder (101) is used as the CRC code.

Here, the division is performed by using an exclusive or, which is equivalent to a modulo 2 operation, on each bit.

(3) The CRC code is attached to the end of the communication data (10110), thereby generating transmission data (10110101).

<Reception Processing in Normal CRC Mode>

(1) The transmission data (10110101) is divided by the generator polynomial (1101) and the remainder found, and it is checked whether or not the value of the remainder is 0. The division is performed by using the modulo 2 operation.

(2) If the value of the remainder is 0, it is considered that an error has not occurred on the communication path, and the communication data (10110) is obtained by removing the CRC code from the transmission data (10110101).

(3) If the value of the remainder is not 0, an error is considered to have occurred on the communication path, and the transmission data (10110101) is discarded.

The following describes special CRC mode.

<Transmission Processing in Special CRC Mode>

(1) The secret information (110) is attached to the end of the communication data (10110), and null data (000) having the same number of bits as the CRC code (i.e. 3 bits) is further attached to the end of the resultant data, thereby generating calculation data (10110110000).

(2) The calculation data (10110110000) is divided by the generator polynomial (1101), and the value of the remainder found. This value of the remainder (010) is used as the CRC code.

(3) The CRC code is attached to the end of the communication data (10110), thereby generating transmission data (10110010).

<Reception Processing in Special CRC Mode>

(1) The transmission data (10110010) is divided by the generator polynomial (1101) and the value of the remainder found, and it is checked whether or not the value of the remainder is 0.

(2) If the value of the remainder is 0, it is considered that an error has not occurred on the communication path, and the communication data (10110) is obtained by removing the CRC code from the transmission data (10110010).

(3) If the value of the remainder is not 0, an error is considered to have occurred on the communication path, and the transmission data (10110010) is discarded.

If the communication interface on the reception side does not support special CRC mode, the transmission data (10110010) transmitted in special CRC mode will be processed in normal CRC mode, and the value of the remainder will be (111), and not 0. Consequently, an error will be considered to have occurred, and the communication data (10110010) will be discarded.

Note that while for simplicity an example is used here of the communication data being five bits, and the secret information being three bits, in reality the communication data is approximately 60 bytes to 1500 bytes (in the case of IEEE 802.3), and the secret information is, for example, 16 bytes. Furthermore, a 33-bit CRC-32 specified by ITU-T is used as the generator polynomial.

The server authentication processing unit 15 performs authentication processing to authenticate the client 20, communicating with the client 20 through the communication interface 12.

The authentication processing performed by the server authentication processing unit 15 in FIG. 2 consists of three stages: (1) sharing the secret information Ks with the client authentication processing unit 25, (2) transmitting an authentication frame to the client authentication processing unit 25, and (3) judging whether the client 20 is a device in the AD according to the response frame from the client authentication processing unit 25.

The secret information Ks shared, for example, by challenge-response authentication between the server authentication processing unit 15 and the client authentication processing unit 25, and using the resultant session key as the secret information Ks. Note that the communication interfaces 12 and 22 are in normal CRC mode during sharing.

After sharing of the secret information Ks, the server authentication processing unit 15 instructs the settings receiving unit 126 to switch to special CRC mode, and inputs the authentication data to the data buffer 121. The transmission CRC unit 122 receives the authentication data from the data buffer 121, and generates a CRC code in special CRC mode. The transmission CRC unit 122 then transmits an authentication frame made up of the authentication data with the CRC code attached thereto to the transmission unit 123. The transmission unit 123 transmits the authentication frame to the client 20.

When the client 20 receives the authentication frame, the reception CRC unit 225 of the client 20 calculates the value of the remainder in special CRC mode. Since the client 20 shares the secret information Ks with the server 10 in advance, the value of the remainder will be 0 if an error has not occurred on the communication path. Therefore, the authentication data is obtained by the client authentication processing unit 25 via the data buffer 22, without being discarded. If the client authentication processing unit 25 obtains the authentication data correctly, it inputs response data to the data buffer 221. The transmission CRC unit 222 receives the response data from the data buffer 221, generates the CRC code in special CRC mode, and transmits a response frame made up of the response data with the CRC data attached thereto to the transmission unit 223. The transmission unit 223 transits the response frame to the server 10.

On receiving the response frame, the server authentication processing unit 15 judges that the client 20 is a device in the AD. Note that since the response frame is also generated in special CRC mode, the reception CRC unit 125 of the server 10 calculates the value of the remainder in special CRC mode, and checks that the value of the remainder is 0.

The following describes the structure of the transmission CRC unit and the reception CRC that realize the described special CRC mode. Note that since the structure of the transmission CRC unit 122 of the server 10 and the transmission CRC unit 222 of the client 20 are the same, the following describes the transmission CRC unit 122 only. This also applies to the reception CRC units, of which only the reception CRC unit 125 of the server 10 is described.

FIG. 4 shows the structure of the transmission CRC unit.

The transmission CRC unit 122 has a mode switch circuit 131, a transmission CRC control circuit 132, and a coding circuit 133.

The mode switch circuit 131 switches between special CRC mode and normal CRC mode according to an instruction from the settings reception unit 126, thereby designating the mode of the transmission CRC control circuit 132.

The transmission CRC control circuit 132 controls MUX 1, MUX 2, and MUX 3 in response to the mode designation from the mode switch circuit 131. Here, MUX 1 has two inputs (0 and 1) and one output, and outputs a "0-side" input signal when the control signal from the transmission CRC circuit 132 is 0, and a "1-side" input signal when the control signal from the transmission CRC circuit 132 is 1.

The coding circuit 133 divides the input calculation data with the generator polynomial CRC-32, and outputs the 32-bit remainder value as a CRC code. In the drawing, "x0", "x1" and so on are exclusive or elements, and "r0", "r1" and so on are shift registers that move a bit to the next shift register each cycle of the clock.

In special CRC mode, in MUX 1 the transmission CRC unit 122 attaches the secret information (b) to the end of the communication data (a) output from the data buffer 121, thereby generating intermediate data (c). Then, in MUX 2 the transmission CRC unit 122 adds 32-bit null data (000 . . . 0) to the end of the intermediate data output from MUX 1, thereby generating calculation data (d). The coding circuit 133 receives the calculation data (d), and outputs a CRC code (e) which is the value of the remainder of dividing the calculation data (d) with the generator polynomial CRC-32. In MUX 3, the transmission CRC unit 122 attaches the CRC code (e) to the communication data (a), thereby generating transmission data (f), and transmits the transmission data (f) to the transmission unit 123 as a communication frame.

In normal CRC mode, the transmission CRC unit 122 does not attach the secret information (b) to the communication data output by the data buffer 121 in MUX 1. Other processing is the same as in special CRC mode.

FIG. 5 shows the data configuration of (a) to (f) in FIG. 4.

Here, (a) indicates communication data. The communication data is made up of a destination address area, an origin address area, a type area, and a payload area. The destination address area and the origin address area have respective 6-byte MAC (media access control) addresses set therein. The type of the data is set in the type area, and the actual data to be transmitted is set in the payload area.

For example, when the server 10 transmits authentication data to the client 20, the MAC address of the client 20 is set in the destination address area, the MAC address of the server 10 is set in the source address area, and the authentication data is set in the payload area.

Furthermore, when the client 20 transmits response data to the server 10, the MAC address of the server 10 is set in the destination address area, the MAC address of the client 20 is set in the source address area, and response data is set in the payload area.

(b) indicates 16-byte secret information Ks.

(c) indicates intermediate data. The intermediate data consists of the communication data (a) with the secret information attached to the end thereof.

(d) indicates calculation data. The calculation data consists of the intermediate data (c) with the 32-bit null data (000 . . . 0) attached to the end thereof.

(e) indicates the 32-bit CRC code calculated in the coding circuit 133.

(f) indicates transmission data. The transmission data consists of the communication data (a) with the CRC code (e) attached to the end thereof.

Figure 6:
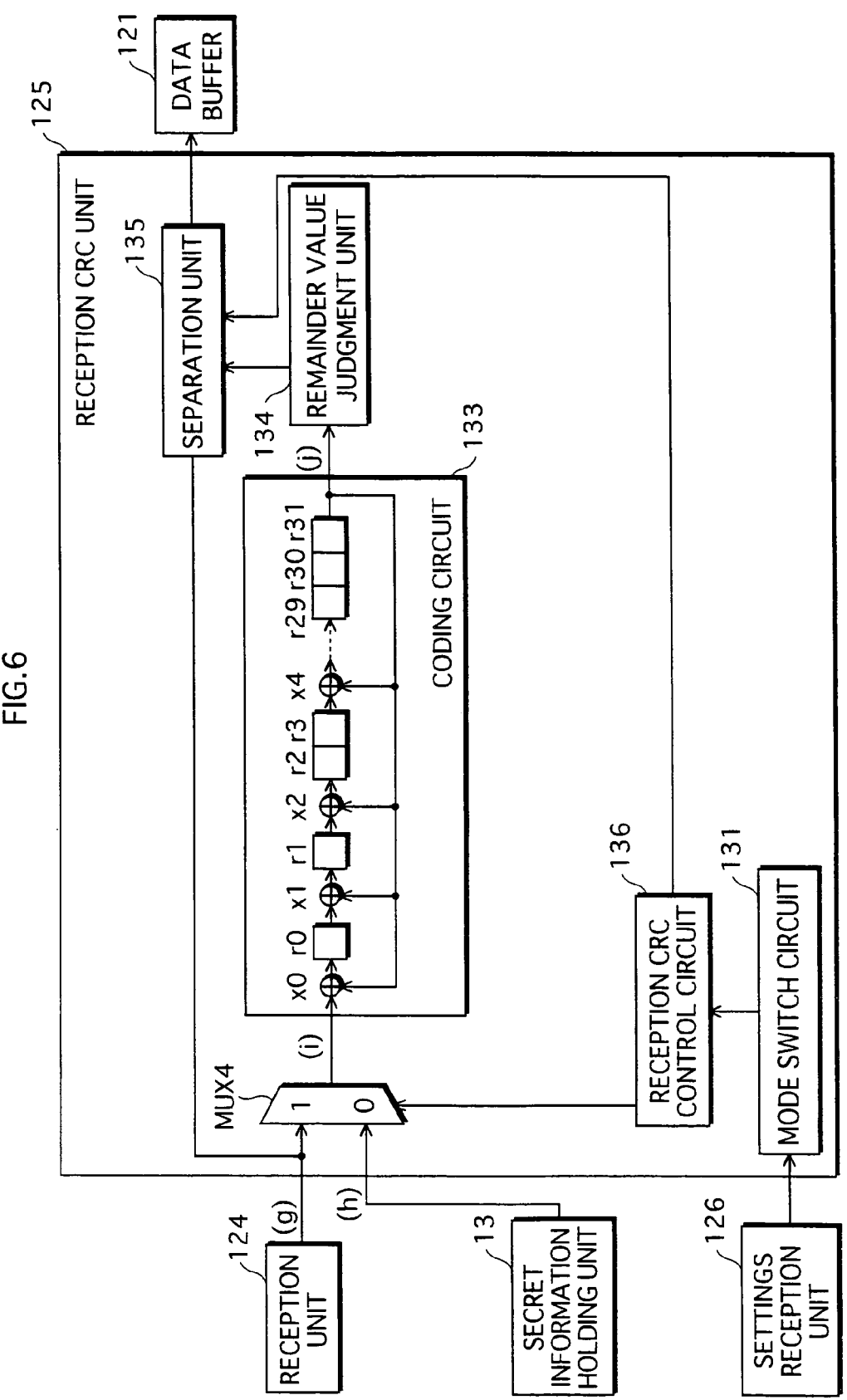
FIG. 6 shows the structure of the reception CRC unit.
Figure 7G:
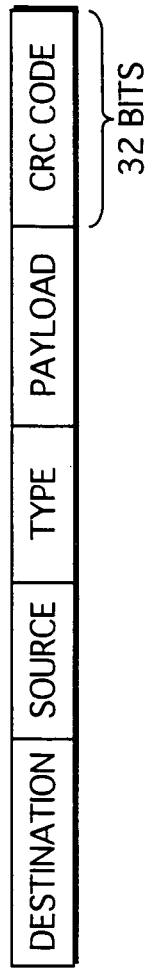
FIG. 7 shows the data configuration of (g) to (j) in FIG. 6.
Figure 7H:
Figure 7I:
Figure 7J:

FIG. 6 shows the structure of the reception CRC unit.

The reception CRC unit 125 includes a mode switch circuit 131, a reception CRC control circuit 136, a coding circuit 133, a remainder value judgment unit 134, and a separation unit 135.

The reception CRC unit 125 has a similar structure to the described transmission CRC unit 122, and therefore only the different parts are described.

In special CRC mode, in MUX 4 the reception CRC unit 125 inserts secret information (h) into transmission data (g) from the reception unit 124, thereby generating calculation data (i). The coding circuit 133 receives the calculation data (i), and outputs a remainder value (j) obtained by dividing the calculation data (i) by the generator polynomial CRC-32. The remainder value (j) is then input into the remainder value judgment unit 134.

The remainder value judgment 134 judges whether or not the value of the remainder calculated by the coding circuit 133 is 0, and notifies the judgment result to the separation unit 135.

If the judgment result is 0, the separation unit 135 separates the CRC code from the transmission data (g), and transmits only the communication data to the data buffer 121. If the judgment result is not 0, the separation unit 135 discards the transmission data (g).

In normal CRC mode, the reception CRC unit 125 does not add the secret information (h) to the transmission data (g) from the reception unit 124 in MUX 4. Other processing is the same as in special CRC mode.

FIG. 7 shows the data configuration of (g) to (j) in FIG. 6.

(g) indicates transmission data, which is the same as (f) in FIG. 5.

(h) indicates 16-byte secret information Ks, which is the same as (b) in FIG. 5.

(i) indicates calculation data. The calculation data consists of the transmission data (g) with the secret information (h) inserted between the payload area and the CRC code area thereof.

(j) indicates a 32-bit remainder value calculated in the coding circuit 133.

Note that, as described earlier, the transmission CRC unit 122 and the reception CRC unit 125 are set to either special CRC mode or normal CRC mode by the server authentication processing unit 15. One possible method is for the transmission CRC unit 122 and the reception CRC unit 125 to be set to normal CRC mode during normal operations, and special CRC mode only during authentication processing.

In this case, since the server authentication unit 15 recognizes the timing with which the authentication data is transmitted as a specification in the protocol, the transmission CRC unit 122 can be set to special CRC mode when CRC processing in special CRC mode is required. Furthermore, when CRC processing in special CRC mode is no longer necessary, the server authentication processing unit 15 can set the transmission CRC unit 122 to normal CRC mode.

However, during authentication processing the reception CRC unit 125 is not limited to receiving only frames transmitted in special CRC mode. This is because, for example, when the server 10 is waiting for transmission of a response frame during authentication processing of the client 20, the server 10 may receive a content distribution request from a client other than the client 20.

Consequently, it is necessary for the server 10 to be able to correctly receive frames transmitted in normal CRC mode even while the server 10 is set in special CRC mode.

To this end, when in special CRC mode, the reception CRC unit 125 may calculate the value of a remainder for a frame received, then, if the value of the remainder is a value other than 0, calculate the value of the remainder in normal CRC mode, and if the value of the remainder is still a value other than 0, judge that an error has occurred on the communication path.

Furthermore, the server 10 may be provided with a CRC unit for the purpose of special CRC processing and a CRC unit for the purpose of normal CRC processing, and perform the processing in parallel.

<Operations>

The following describes operations of the server and client of the present embodiment.

Figure 8:
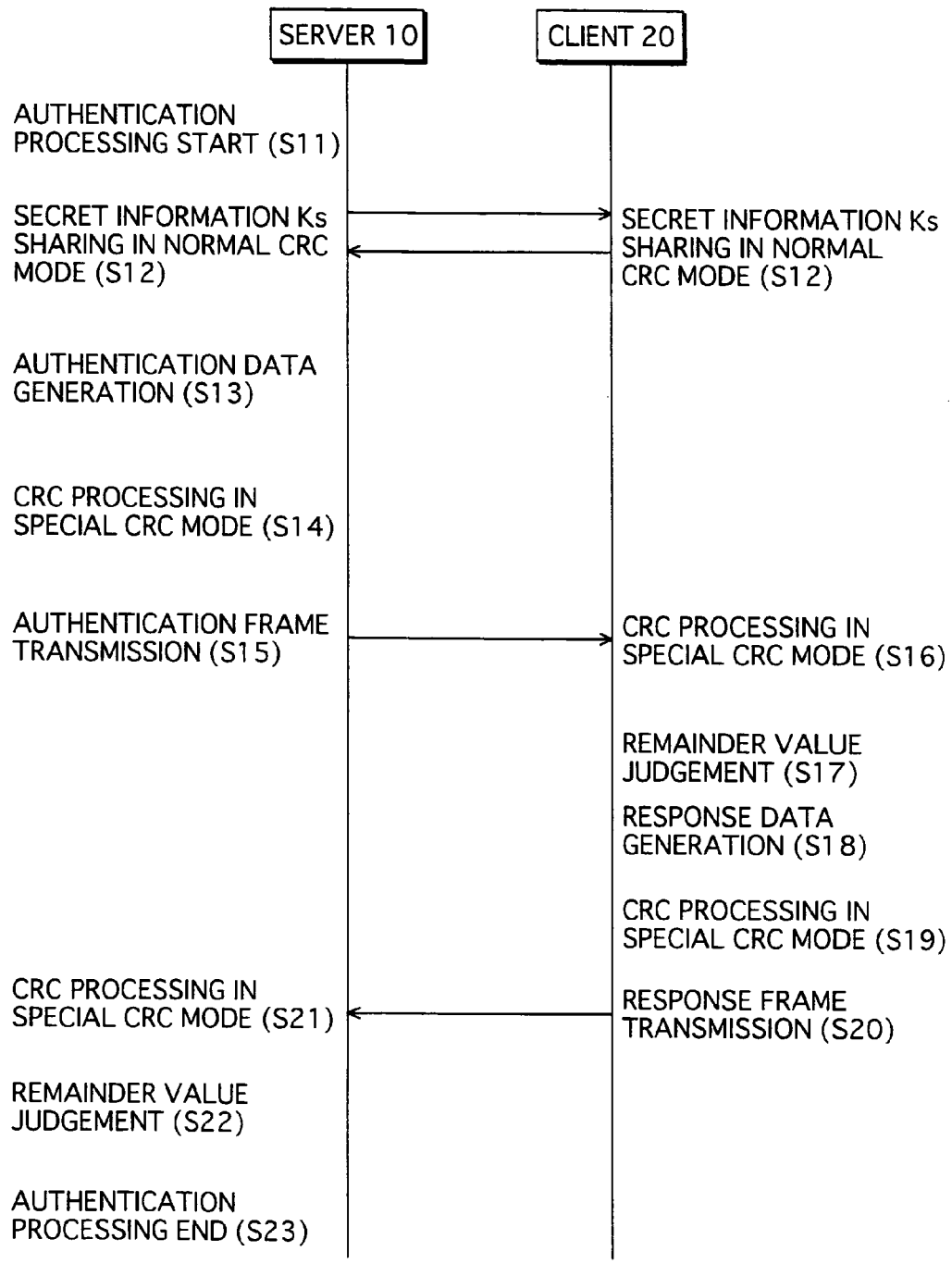
FIG. 8 shows operations by the server and client in authentication processing.

FIG. 8 shows operations of the server and client in authentication processing.

The server 10 receives a content distribution request from the client 20, and commences authentication processing to confirm whether or not the client 20 is a device in the AD (S11).

First, the server 10 and the client 20 share secret information Ks (S12). The secret information Ks sharing is performed, for example, by challenge-response authentication between the server authentication processing unit 15 and the client authentication processing unit 25, with the session key obtained as a result used as the secret information Ks. Note that at this time the communication interfaces 12 and 22 are in normal CRC mode.

Specifically, the secret information Ks is shared as follows.

The server 10 and the client 20 hold respective public key encryption key pairs (a public key and a secret key) and certificates. The server 10 generates a random number An which it transmits to the client 20 as challenge data. Then, the server 10 receives response data that is a signature generated by the client 20 using the secret key of the client 20 on the random number An, and the certificate.

The server 10 confirms the authenticity of the public key of the client 20 with the certificate, and then verifies the response data using the public key. The client 20 performs the same kind of operations, and verifies the response data from the server 10.

Furthermore, the server 10 and the client 20 share the session key as secret information Ks using a Diffie-Hellman (DH) key sharing system.

After the secret information Ks has been shared in this way, the server 10 generates authentication data (S13), applies CRC processing in special CRC mode (S14), and transmits an authentication frame to the client 20 (S15).

The client 20 receives the authentication frame, and applies CRC processing in special CRC mode to calculate the value of the remainder (S16).

Next, the client 20 judges whether or not the value of the remainder is 0 (S17). Since the client 20 shares the secret information Ks with the server 10, the value of the remainder will be 0 if an error does not occur on the communication path.

If the value of the remainder is 0, the client 20 generates response data (S18), applies CRC processing in special CRC mode (S19), and transmits the response frame to the server 10 (S20).

If the value of the remainder is not 0, the client 20 determines that an error has occurred on the communication path and discards the authentication data.

The server 10 receives the response frame, applies CRC processing in special CRC mode, and calculates the value of the remainder (S21).

The server 10 then judges whether or not the value of the remainder is 0 (S22). Since the server 10 shares the secret information Ks with the client 20, the value of the remainder will be 0 if an error does not occur on the communication path.

If the value of the remainder is 0, the server 10 recognizes the client 20 as being a device in the AD, and ends the authentication processing (S23).

If the value of the remainder is not 0, the server 10 determines that an error has occurred on the communication path and discards the response data.

The following describes operations by the server 10 and a client outside of the AD (hereinafter called an external client) when the external client makes a content distribution request to the server 10.

Figure 9:
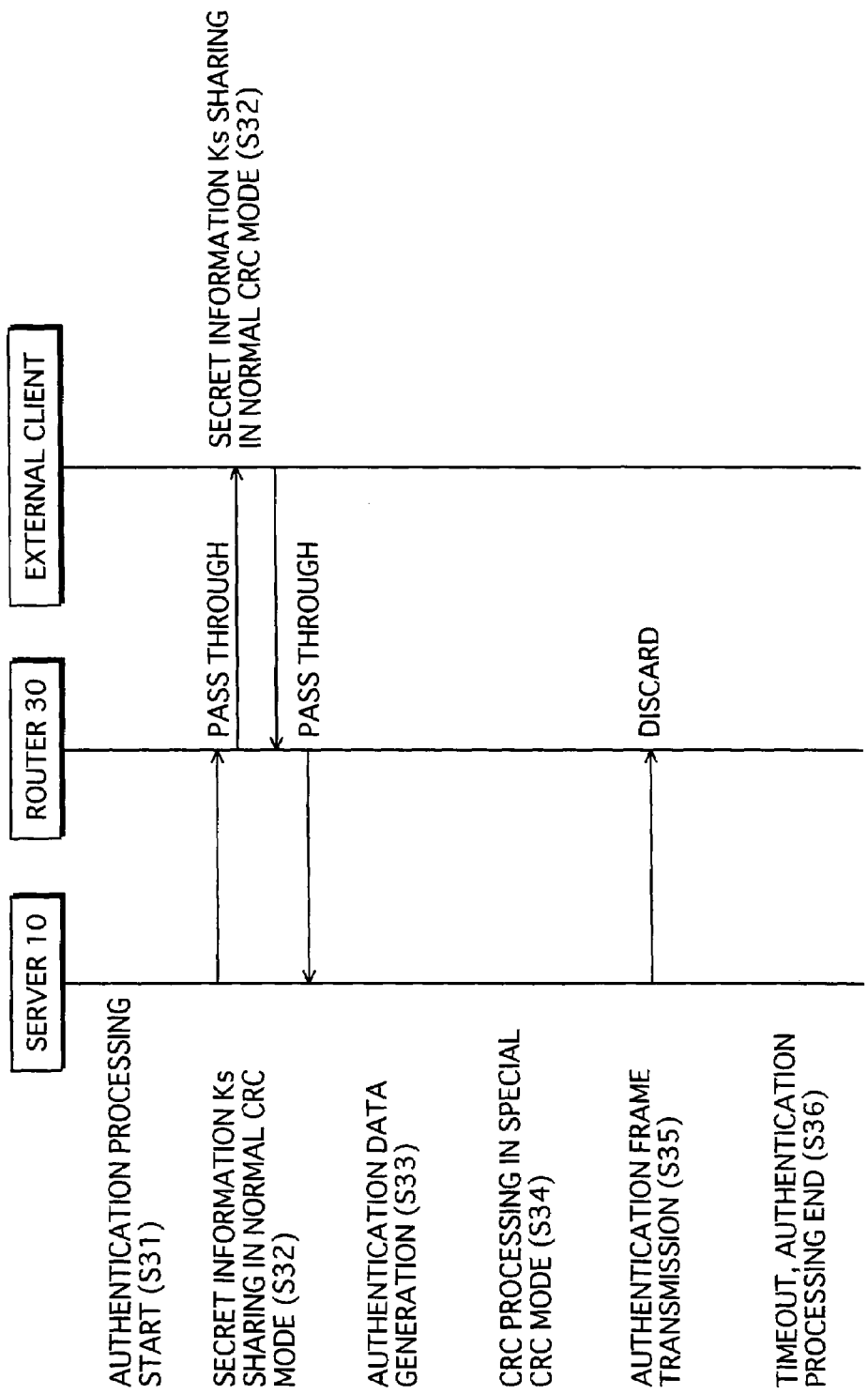
FIG. 9 shows operations by the server and a client outside the AD in authentication processing.

FIG. 9 shows operations by the server and the external client in authentication processing.

The server 10 receives a content distribution request from the external client, and commences authentication processing to confirm whether or not the client is a device in the AD (S31).

First, the server 10 and the client perform sharing of the secret information Ks (S32). Note that since communication is performed in normal CRC mode here, the transmitted frame passes through the router 30.

After the secret information Ks is shared, the server 10 generates authentication data (S33), applies CRC mode processing in special CRC mode (S34), and transmits an authentication frame to the external client (S35).

However, since the router 30 does not support special CRC mode, it determines that an error has occurred on the communication path, and discards the received authentication frame.

The external client waits to receive an authentication frame, but since the authentication frame has been discarded by the router 30, the external client times out without receiving the frame. Meanwhile, after transmitting the authentication frame, the server 10 waits to receive a response frame from the client, but times out without receiving the response frame, and the authentication processing ends (S36).

Note that the router 30 may have a structure by which, after discarding the authentication frame, it requests the server 10 to re-transmit an authentication frame. In this case, the server 10 re-transmits the authentication frame, but the router 30 again discards the retransmission frame. These operations are repeated. Here, the server 10 may count the number of times re-transmission is performed, and forcedly end the authentication processing after a certain number of times.

In this way, in the present embodiment, the server 10 and the client 20 support special CRC mode, and the server 10 is able to authenticate the client 20 as being a device in the AD. On the other hand, the router 30 does not support special CRC mode, and therefore discards any authentication frames received from the server 10. This means that authentication frames from the server 10 do not reach the external client, and the external client is unable to receive authentication.

After the described processing, the server 10 distributes contents, and therefore the client in the AD is able to have the contents distributed thereto, while the external client is unable to have the contents distributed thereto. Consequently, unlimited sharing can be prevented.

This completes the description of the first embodiment.

Note that the functional blocks in the server 10, i.e., the server authentication processing unit 15, the secret information holding unit 13, the data buffer 121, the transmission CRC unit 122, the transmission unit 123, the reception unit 124, the reception CRC unit 125, and the settings receiving unit 126 are typically implemented as an integrated circuit, specifically, an LSI (large-scale integrated circuit).

Similarly, the functional blocks in the client 20, i.e., the client authentication processing unit 25, the secret information holding unit 23, the data buffer 221, the transmission CRC unit 222, the transmission unit 223, the reception unit 224, the reception CRC unit 225, and the settings receiving unit 226 are typically implemented as an integrate circuit, specifically, an LSI.

Either of the LSIs described here may be called an IC, a system LSI, a super LSI, or an ultra LSI, depending on the degree of integration.

Furthermore, the integrated circuits are not limited to being LSI, but may be implemented as special-purpose circuits or general-purpose circuits. An FPGA (field programmable gate array) that is programmable after manufacturing the LSI may be used, or a re-configurable processor in which the connection of the circuit cells and the settings in the LSI are re-configurable may be used.

Furthermore, if technology for an integrated circuit that replaces LSIs appears due to advances in or derivations from semiconductor technology, that technology may be used for integration of the functional blocks. Bio-technology is one possible application.

Second Embodiment

<Overview>

In the described first embodiment, the authentication frame is prevented from reaching other networks across the router 30 in the authentication processing. This means that contents stored in the server 10 are shared only in a sub-network one subordinate to the router 30. From another point of view, it can be said that the range of the AD is limited to one sub-network.

However, if the range of the AD is limited to one sub-network, a problem occurs that, for example, the user who operates different networks upstairs and downstairs in his or her home will be unable to use contents stored in the downstairs server in an upstairs device.

For this reason, in the present embodiment, the MAC addresses of the server and the client are registered in advance in the router, and if a frame for one of the registered MAC addresses is received, the frame is transferred without error detection using a CRC code. This means that when an authentication frame is transmitted by the server via the router to the client, the authentication frame is not discarded by the router, and authentication is performed across the router.

Figure 10:
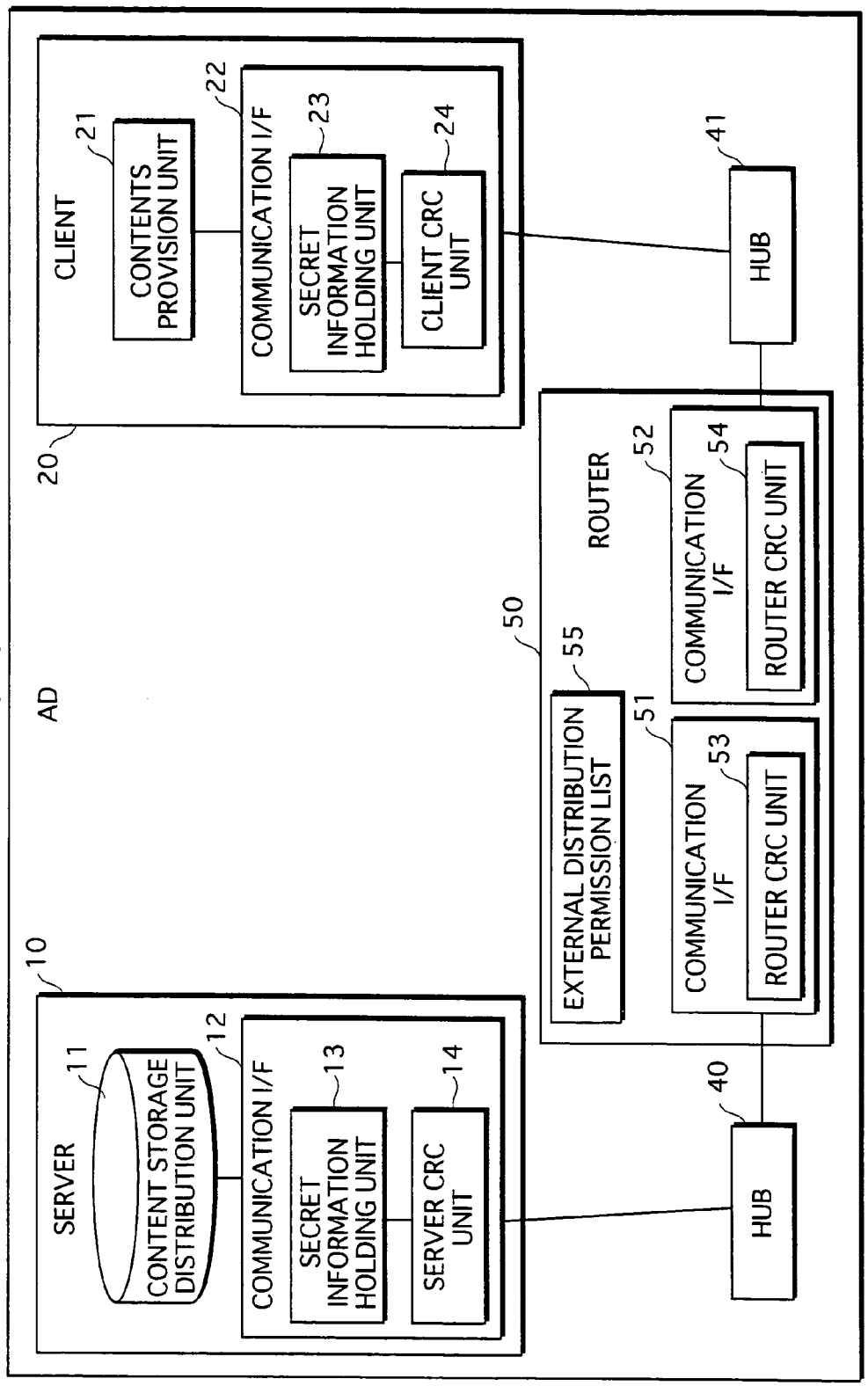
FIG. 10 shows an overview of an AD of the second embodiment.

FIG. 10 shows an overview of the AD of the second embodiment.

The AD includes the server 10, the client 20, a router 50 and hubs 40 and 41.

The server 10 and the client 20 differ from the first embodiment in that they are connected via the router 50 and belong, respectively, to different network addresses, however their internal structure is the same as in the first embodiment.

Consequently, the present embodiment is the same as the first embodiment in that the server 10 and the client 20 share secret information Ks in advance, and the server 10 applies special CRC mode CRC processing to authentication data in the server CRC unit 14, and generates an authentication frame which it transmits to the client 20.

Furthermore, if the client 20 receives an authentication frame, it applies CRC processing in special CRC mode and calculates the value of the remainder, and judges whether or not the value of the remainder is 0. The subsequent processing for transmitting the response frame is the same.

The router 50 of the present embodiment has registered therein, in advance, an external distribution permission list of MAC addresses of devices to which distribution of contents is permitted. If the destination MAC address included in a received frame is registered in the external distribution permission list, the router 50 transfers the frame without performing error detection. This means that if the MAC address of the server 10 and the MAC address of the client 20 are registered, authentication frames from the server 10 to the client 20 and response frames from the client 20 to the server 10 are transferred without error detection using the CRC code. Note that this applies not only to authentication frames and response frames, but also to content frames in which contents is stored.

<Structure>

Figure 11:
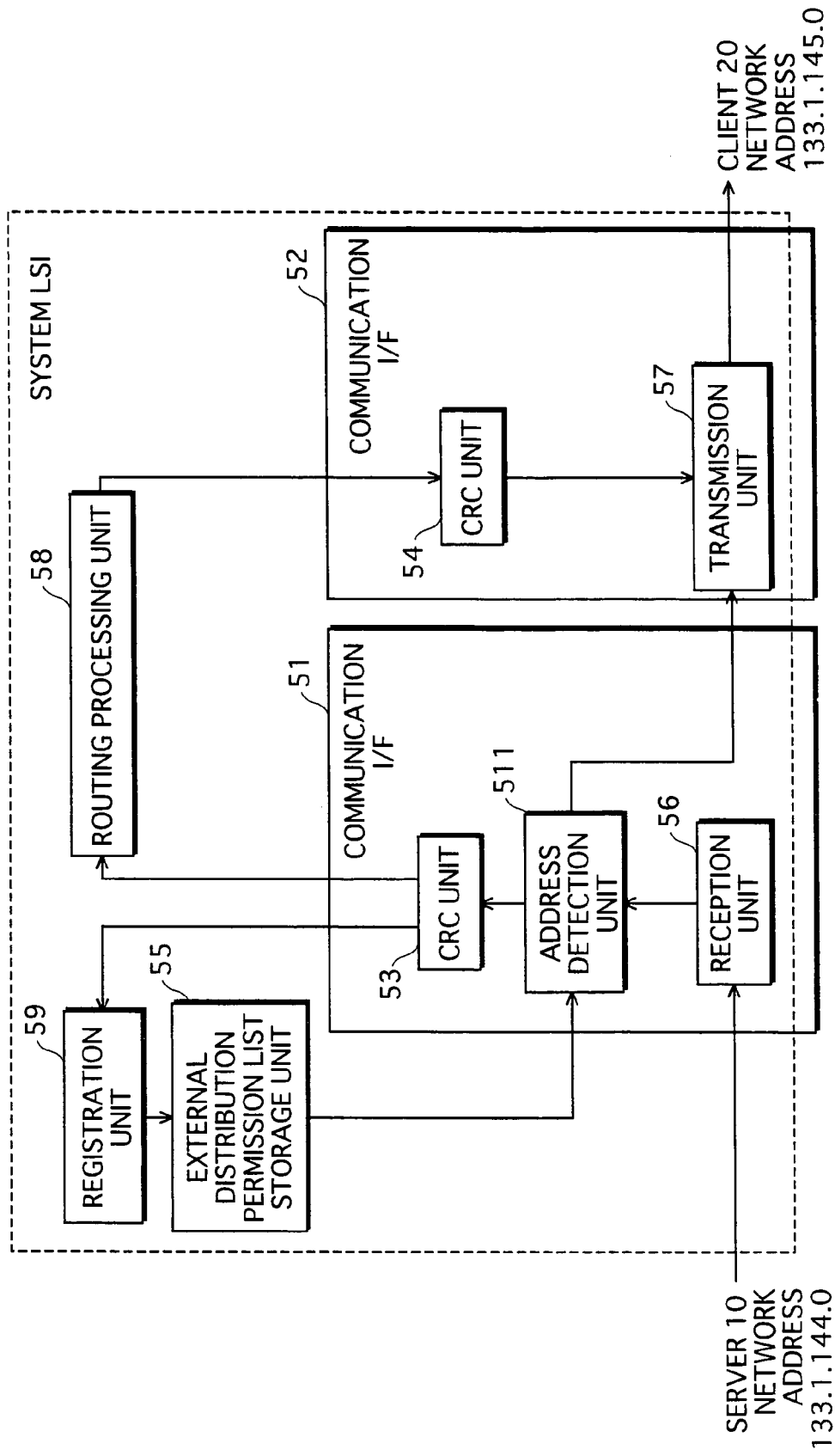
FIG. 11 shows the structure of a router when transferring a frame from a server to a client.

FIG. 11 shows the structure of the router 50 when a frame is transferred from the server 10 to the client 20.

The router 50 includes two communication interfaces 51 and 52, an external distribution permission list storage unit 55, a routing processing unit 58, and a registration unit 59. Note that for reasons of simplicity, the communication interface 51 is shown as having only a reception function and the communication interface 52 is shown as having only a transmission function, but in reality the communication interface 51 also has a transmission function and the communication interface 52 also has a reception function. Furthermore, the number of communication interfaces is not limited to two.

The reception unit 56 receives a frame from the server 10, and inputs the frame to the address check unit 511.

The address check unit 511 detects the destination MAC address and source MAC address included in the frame, and judges whether or not the MAC addresses and the corresponding communication interface are registered in the external distribution permission list. If they are registered, the address check unit 511 transfers the frame to the transmission unit of the corresponding communication interface (the transmission unit 57 of the communication interface 52 in FIG. 11). If the one or more of the MAC addresses and the corresponding communication interface are not registered in the external distribution permission list, the address check unit 511 inputs the frame to the CRC unit 53.

The CRC unit 53 performs error detection of the frame using the CRC code, and judges whether or not the value of the remainder is 0. If the value of the remainder is 0, the CRC unit 53 obtains the communication data included in the frame since an error has not occurred on the communication path. If the value of the remainder is not 0, the CRC unit 53 discards the frame since an error is considered to have occurred on the communication path. Note that the CRC unit 53 supports only normal CRC mode.

The routing processing unit 58 has an internal routing table, and transfers the obtained communication data to the communication interface corresponding to the destination network address (the communication interface 52 in FIG. 11).

The CRC unit 54 applies CRC processing to the communication data transferred from the routing processing unit 58, and inputs the communication data to the transmission unit 57. Note that the CRC unit 54 supports only normal CRC mode.

If the received frame is an address registration frame, the registration unit 59 registers the device network address, the device MAC address and the device name set in the registration frame and the communication interface that received the address registration frame, in a network address column 550, a MAC address column 551, a device column 552, and a port column 553, respectively, in the external distribution permission list.

This enables the server 10 to register, from the address registration frame, its own network address, MAC address, device name, and communication interface of the router 50 to which the server 10 is attached. This is the same for the client 20.

FIG. 12 shows an example of the external distribution permission list.

This shows that a server having a MAC address (08-00-16-21-5A-63) is on a network address (133.1.144.0), and a communication interface that received an address registration frame is port 1. The router 50 recognizes the network on which the server exists as being in the AD, and other networks as being outside the AD.

In other words, the television and the game machine of the network address (133.1.145.0) are devices outside the AD. Normally devices outside the AD are unable to receive authentication, but if they are registered in the external distribution permission list, they are able to receive authentication from the server.

Since settings of registration of network addresses are able to be modified by a malicious user, it is possible that external devices may be set as if they were devices in the AD. For example, the HDD recorder in registered falsely as being on the network address (133.1.144.0).

However, since the router 50 registers the communication interface that received the address registration frame in the column 553, the router 50 is able to detect that the HDD recorder is falsely registered because the network address column 550 and the port column 553 do not match.

In this way, the router 50 prohibits frame transfer to external devices falsely registered.

Note that prohibition of frame transfer to an external device may be lifted when the network address and port in the external distribution permission list have been corrected, or may remain even if the network address and port are corrected.

According to the described structure, even if the router 50 receives a frame to which a special CRC code is attached, if the destination network address shown by the frame is registered in the external distribution permission list, the frame can be transferred without error detection in the CRC unit.

<Operations>

The following describes operations by the router 50. Note that the authentication processing of the server 10 and client 20 are as described in the first embodiment, and are therefore omitted from the following description.

Figure 13:
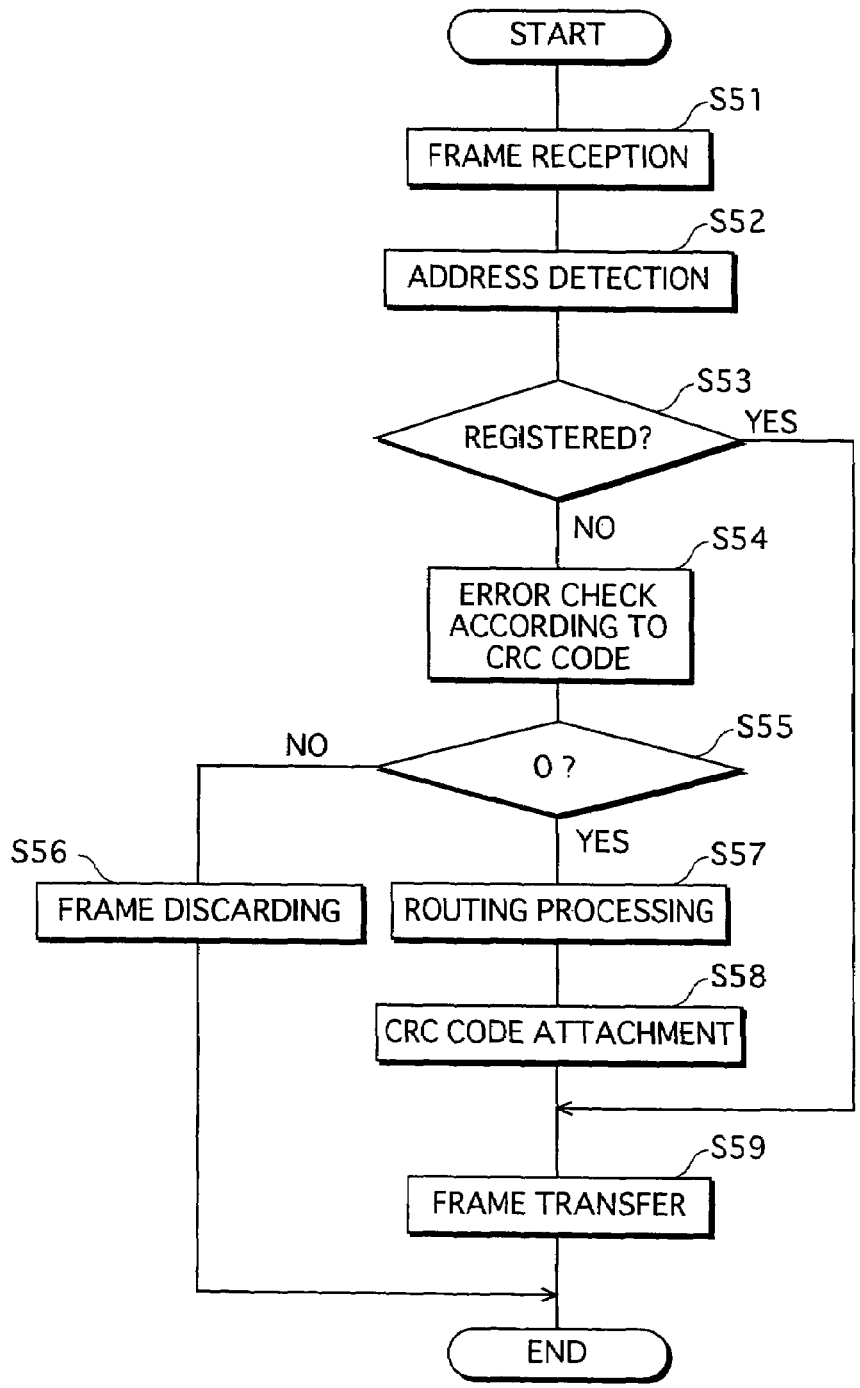
FIG. 13 shows operations of the router a frame has been received.

FIG. 13 shows operations of the router 50 when a frame is received.

The router 50 receives the frame (S31).

On receiving the frame, the router 50 detects the destination MAC address included in the frame (S32).

If the detected MAC address is registered in the external distribution permission list (S33: YES), the router 50 transfers the received frame via the communication interface corresponding to the registered MAC address (S39).

If the detected MAC address is not registered on the external distribution permission list (S33: NO), the router 50 performs error detection using the CRC code (S34).

If the value of the remainder is not 0 (S35: NO), the router 50 considers an error to have occurred on the communication path and discards the frame (S36).

If the value of the remainder is 0 (S35: YES), the router 50 considers that an error has not occurred on the communication path and performs routing (S37).

According to the routing processing, the router 50 specifies the destination communication interface, calculates a CRC code which it attaches to the frame (S38), and transmits the frame with the CRC code attached (S39).

In this way, the present embodiment registers, in advance, the MAC address of the server 10 and the MAC address of the client 20, and a frame from the server 10 to the client 20 or from the client 20 to the server 10 is transferred without error detection using the CRC code. This means that even the client 20 on a different network to the server 10 is able to have the contents distributed.

This completes the description of the second embodiment.

Note that the functional blocks, i.e., the CRC units 53 and 54, the external distribution permission list storage unit 55, the reception unit 56, the transmission unit 57, the routing processing unit 58, the registration unit 59, and the address check unit 511 are typically implemented as an integrated circuit, specifically, an LSI.

The LSI described here may be called an IC, a system LSI, a super LSI, or an ultra LSI, depending on the degree of integration.

Furthermore, the integrated circuit is not limited to being LSI, but may be implemented as special-purpose circuits or general-purpose circuits. An FPGA (field programmable gate array) that is programmable after manufacturing the LSI may be used, or a re-configurable processor in which the connection of the circuit cells and the settings in the LSI are re-configurable may be used.

Furthermore, if technology for an integrated circuit that replaces LSIs appears due to advances in or derivations from semiconductor technology, that technology may be used for integration of the functional blocks. Bio-technology is one possible application.

Third Embodiment

<Overview>

In the second embodiment, the router registers, in advance, the MAC addresses of the server and the client, and when it receives a frame for one of the registered MAC addresses, transfers the frame without performing error check with the CRC code. This prevents frames transmitted by the sever to the client via the router from being discarded by the router, even if the communication interface of the router does not support special CRC mode.

However, with this method the router transfers frames from the server to the router without performing error detection, even if an error occurs on the communication path. This is particularly problematic in an environment in which the network is often busy.

In light of this problem, the present embodiment enables special CRC mode error detection in the router, by providing a communication interface that supports special CRC mode in the router. This prevents the router from transferring a frame in which an error has occurred. As in the first embodiment, in the present embodiment the communication interface connected to the external network supports only normal CRC mode. This prevents unlimited sharing of contents.

Figure 14:
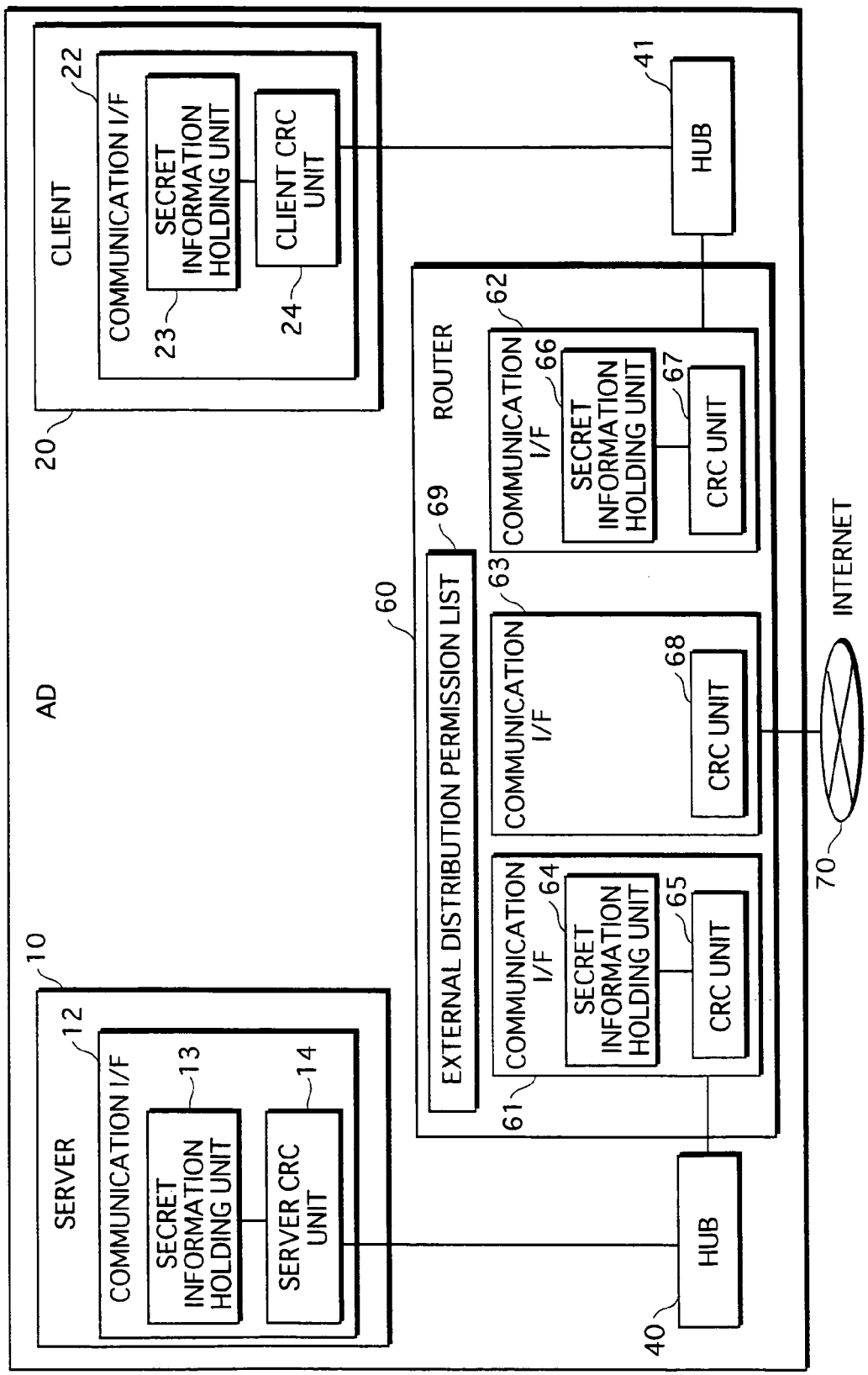
FIG. 14 shows an overview of an AD of a third embodiment.

FIG. 14 shows an overview of the AD of the third embodiment.

The AD includes the server 10, the client 20, a router 60, and hubs 40 and 41.

The server 10 and the client 20, as in the second embodiment, are connected via the router 60 and belong to different network addresses.

The router 60 includes communication interfaces 61, 62, and 63, and an authenticated device list 69. The communication interfaces 61 and 62 support CRC processing in special CRC mode. The communication interface 63 supports CRC processing in normal CRC mode only.

The server 10 and the client 20 are connected to the communication interface 61 and 62, respectively, and the Internet 70, which is outside the AD, is connected to the communication interface 63.

Contents is distributed according to the following procedure in the present embodiment.

(1) Before content distribution, the server 10 performs authentication processing to check that the router 60 is a device in the AD. The authentication processing is performed as described in the first embodiment.

(2) Similarly, before contents distribution, the client 20 performs authentication processing to check that the router 60 is a device in the AD.

(3) If authentication processing between the server 10 and the client 20 has finished normally, the router 60 registers the MAC addresses of the server 10 and the client 20 in an authenticated device list.

(4) On receiving a content frame storing contents from the server 10 and destined for the client 20, the router 60 performs error detection in special CRC mode, and judges whether or not an error has occurred.

(5) When it is judged that an error has not occurred, the router 60 refers to the authenticated device list, and, if the server 10 and the client 20 are registered in the authenticated device list, performs CRC processing of the content frame in special CRC mode, and transmits the content frame to the client 20.

In this way, in the present embodiment, transfer of a frame in which an error has occurred is prevented because the router 60 performs error detection when relaying a frame. Therefore, network resources can be used more effectively.

Furthermore, the communication interface that is connected to the Internet 70, which is an external network, supports only normal CRC mode, and therefore clients outside the AD cannot perform authentication processing with the router 60. Consequently, clients outside the AD are not registered in the authenticated device list, and are not able to receive distribution of contents from the server 10. This prevents unlimited use of contents.

<Structure>

Figure 15:
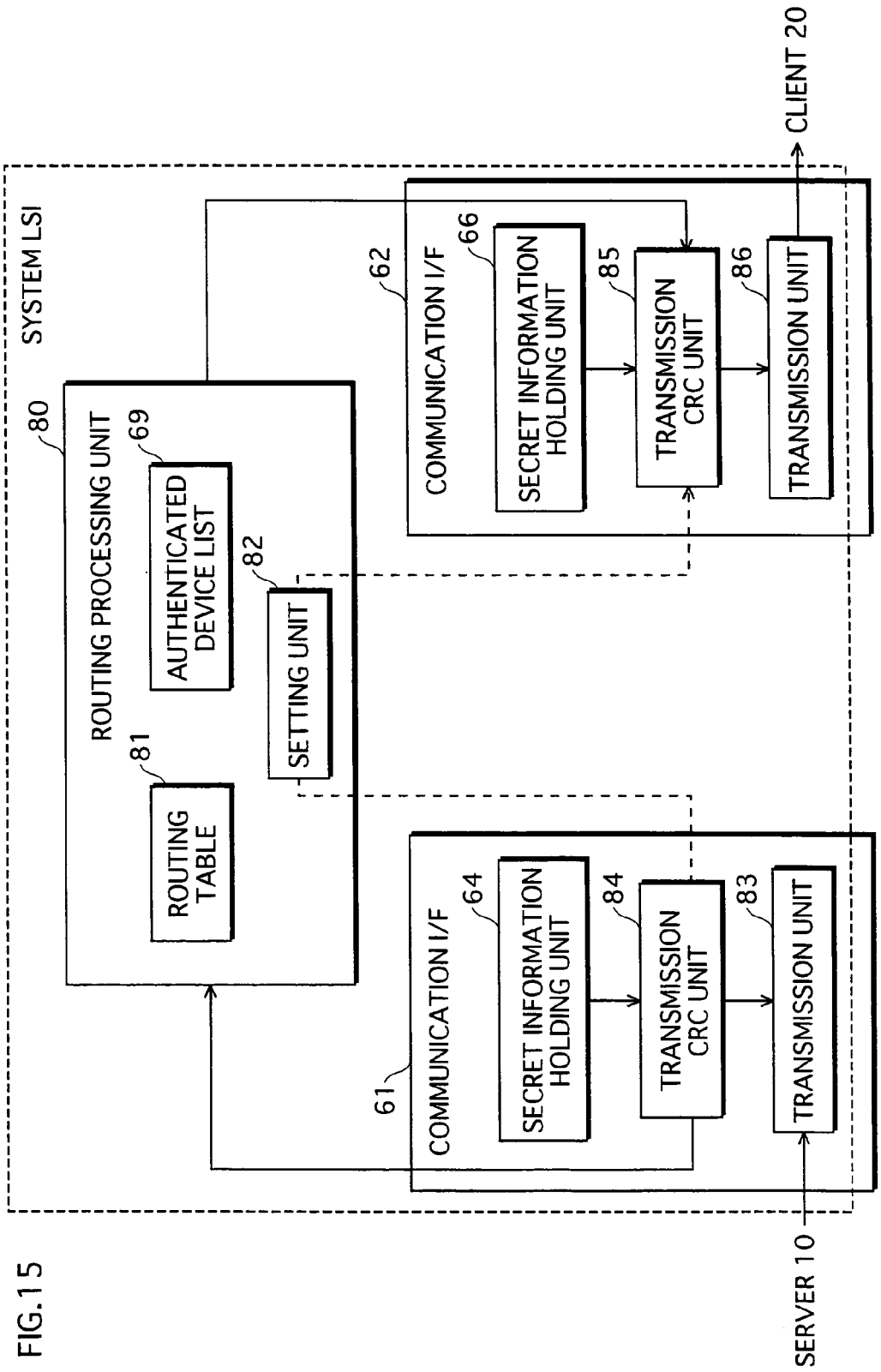
FIG. 15 shows the structure of the router when transferring a content frame from the server to the client.

FIG. 15 shows the structure of the router 60 when a content frame is transmitted from the server 10 to the client 20.

The router 60 includes communication interfaces 61 and 62, and a routing processing unit 80. The communication interfaces 61 and 62 are the same as the communication interface 12 in FIG. 2, but only the reception function of the communication interface 61 and the transmission function of the communication interface 62 are shown here.

The routing processing unit 80 includes a routing table 81, the authenticated device list 69 and a setting unit 82.

The communication interfaces of the router 60 and the network addresses connected thereto are registered in correspondence in the routing table 81.

Devices that are authenticated as being devices in the AD in authentication processing with the router 60 are registered in correspondence with their MAC addresses in the authenticated device list 69.

On receiving a frame that has been subject to CRC processing in normal CRC mode, the routing processing unit 80 refers to the routing table 81 and transfers the received frame to the corresponding communication interface. On receiving a frame that has been subject to CRC processing in special CRC mode, the routing processing unit 80 refers to the authenticated device list 69 and transfers the received frame to the corresponding communication interface.

The setting unit 82 receives notification from the reception CRC unit 84 of which of normal CRC mode and special CRC mode the received frame has been subject to, and sets the transmission CRC unit 85.

In other words, a frame that has been subject to CRC processing in special CRC mode in the server 10 is also subject to CRC processing in special mode in the router 60 before being transferred. Furthermore, a frame that has been subject to CRC processing in normal CRC mode in the server 10 is also subject to CRC processing in normal mode in the router 60 before being transferred.

Since the communication interface 63 does not support special CRC mode, this structure prevents contents from being transferred to an external client if the server 10 mistakenly attempts to transmit content frames that have been subject to CRC processing in special CRC mode to an external client. This prevents distribution of contents to clients outside the AD.

FIG. 16 shows an example of the authenticated device list.

This shows that, for example, a server of a MAC address (08-00-16-21-5A-63) exists on a network address (133.1.144.0), and that the communication interface connected to that network address is port 1.

Information included in authentication data is registered divided into a network address column 690, a MAC address column 691, a device column 692, and a port column 693 by the router 60 after authentication is completed correctly. In other words, since the authentication registration list is not registered by the user, it is unnecessary to provide a user interface, and it is difficult for the user to change the settings.

<Operations>

The following describes operations of the router 60. Note that the authentication processing between the router 60 and the server 10, and the authentication processing between the router 60 and the client 20 are the same as in the first embodiment, and are omitted from the following description.

Figure 17:
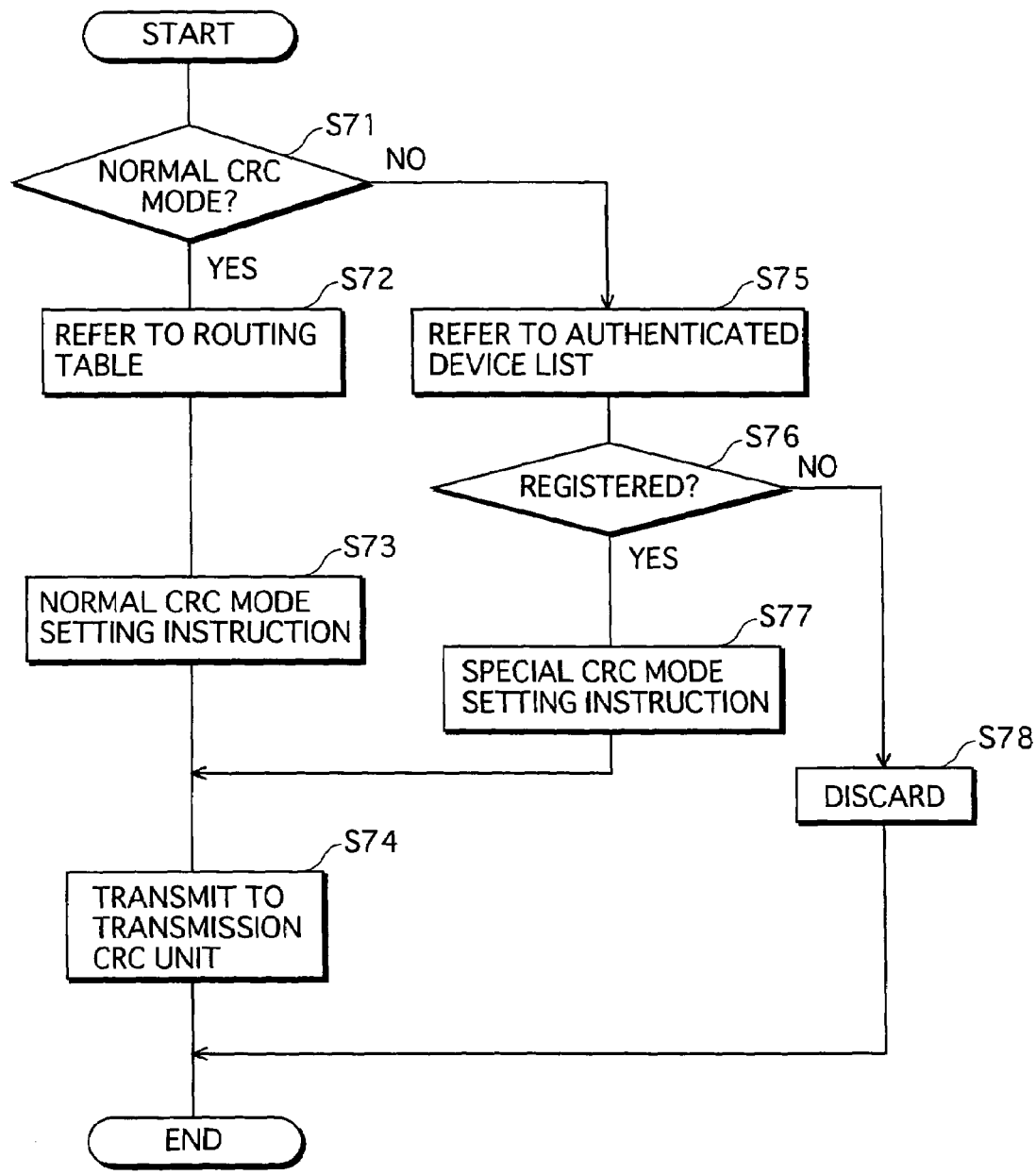
FIG. 17 shows operations by a router for routing processing.

FIG. 17 shows operations of routing processing by the router 60.

The router 60 commences routing processing if a received frame is not destined for the router 60 itself, but is to be transferred.

The routing processing unit 80 receives notification, from the communication interface that received the frame, of which of special CRC mode and normal CRC mode the frame was judged not to have an error in. If the notified mode is normal CRC mode (S71: YES), the routing processing unit 80 refers to the routing table (S72), specifies the communication interface corresponding to the destination network address of the communication data, and sends a normal CRC mode setting instruction to the transmission CRC unit of the specified communication interface (S73). The routing processing unit 80 then transmits the transmission data (S74).

When special CRC mode is notified at step S71 (S71: NO), the routing processing unit 80 refers to the authenticated device list (S75) and judges whether the server 10 and the client 20 are registered (S76).

If the server 10 and the client 20 are registered (S76: YES), the routing processing unit 80 specifies the communication interface corresponding to the destination MAC address of the communication data, sends a special CRC mode setting instruction to the CRC unit of the specified communication interface (S77), and transfers the data (S74).

When the routing processing unit 80 determines one or both of the server 10 and the client 20 not to be registered at step S76 (S76: NO), the data is discarded (S78).

In this way, in the present embodiment, the router 60 performs error detection when relaying frames, and is able to prevent transfer of frames in which an error has occurred. Therefore, network resources can be used effectively. This is particularly effective for a wireless LAN in which errors occur easily on the communication path and of which the network is often busy.

Furthermore, since the communication interface that is connected to the Internet 70 that is outside the AD supports normal AD mode only, an external client is unable to perform authentication processing with the router 60. Consequently, the external client is not registered in the authenticated device list, and cannot have contents distributed from the server 10. This prevents unlimited use of contents.

This completes the description of the third embodiment.

Note that the routing processing unit 80 and its internal routing table 81, authenticated device list 69 and setting unit 82, as well as the functional blocks, i.e., the secret information storage units 64 and 66, the transmission CRC unit 84 and 85, and the transmission units 83 and 86 are typically implemented as an integrated circuit, specifically, an LSI.

The LSI described here may be called an IC, a system LSI, a super LSI, or an ultra LSI, depending on the degree of integration.

Furthermore, the integrated circuit is not limited to being LSI, but may be implemented as special-purpose circuits or general-purpose circuits. An FPGA (field programmable gate array) that is programmable after manufacturing the LSI may be used, or a re-configurable processor in which the connection of the circuit cells and the settings in the LSI are re-configurable may be used.

Furthermore, if technology for an integrated circuit that replaces LSIs appears due to advances in or derivations from semiconductor technology, that technology may be used for integration of the functional blocks. Bio-technology is one possible application.

Modification Examples

Although the embodiments are based on the premise that the CRC code in special CRC mode and the CRC code in normal CRC mode are different, there is a certain probability that these CRC codes will be equivalent. If the CRC codes are equivalent, even a client or router that supports only normal mode will be able to correctly obtain communication data to which a special CRC mode CRC code is attached.

In view of this problem, the following structure may be used so that a client or router that supports only normal CRC mode is unable to obtain communication data even if the CRC code in special CRC mode and the CRC code in normal CRC mode are equivalent.

<Transmission Processing>

(1) A CRC code for when secret information is attached to communication data and a normal CRC code are both calculated.

(2) The CRC code for when secret information is attached and the normal CRC code are compared.

(3) When the two CRC codes are equivalent, the bits in the CRC code for when secret information is attached are inverted, and the inverted CRC code is attached to the communication data. For example, if the CRC code for when secret information is attached is (101), the bit-inverted code will be (010).

(4) When the CRC code for when secret information is attached to communication data and the normal CRC code are different, the secret information with the CRC code added thereto is attached to the communication data.

<Reception Processing>

(1) A CRC code for when secret information is attached to communication data and a normal CRC code are both calculated.

(2) The CRC code for when secret information is attached and the normal CRC code are compared.

(3) When the two CRC codes are equivalent, the bits in the CRC code attached to the communication data are inverted, and the inverted CRC code and the CRC code for when the secret information is attached are compared. If the two CRC codes are equivalent, the communication data is obtained.

(4) When the CRC code for when the secret information is added and the normal CRC code are equivalent, the CRC code attached to the communication data is inverted, and the inverted CRC code and the CRC code for when the secret information is attached are compared. The communication data is discarded if the CRC codes do not match.

(5) When the CRC code for when the secret information is added and the normal CRC code are different, the CRC code attached to the communication data and the CRC code for when the secret information is added are compared. The communication data is obtained if the two are equivalent.

(6) When the CRC code for when the secret code is added and the normal CRC code are different, the CRC code attached to the communication data and the CRC code for when the secret information is added are compared. The communication data is discarded if the two are different.

According to the described structure, even when a CRC code calculated after adding the secret information to the communication data and a CRC code calculated without adding the secret information are equivalent, a CRC code can be recognized as having been calculated after the secret information was added.

Note that the authentication method of the present invention may be used for authentication processing for purposes other than contents distribution.

Furthermore, the authentication method may be applied regardless of whether the data link layer specification is an Ethernet (TM), a wireless LAN, Bluetooth or another data link layer specification.

The CRC code may be an encryption hash value (32 bits) instead of a checksum, in order to make the secret information more difficult to decode.

Furthermore, in order to improve security, the CRC code may be an encryption hash value of 160 bits, for example, instead of 32 bits.

Moreover, the payload segment may be encrypted to further improve security.

Note that although each of the embodiments includes a stage at which secret information is shared in encryption processing, the secret information may be stored in the devices in advance, in order to reduce the time required for authentication processing.

Furthermore, the method used to share the secret information is not limited to that described in the first embodiment, but may be any method that enables the server and the client to share secret information.

Authentication processing may be performed a plurality of times in the embodiments since a possibility exists that error will actually occur on the communication path. If authentication processing is performed a plurality of times, the secret information may be changed each time in order to increase security.

Furthermore, in order to ensure anonymity with respect to a third party, the reception and transmission terminals may notify each other of false addresses, and use the false addresses in the subsequent authentication processing, thereby making it difficult for the third party to identify the transmission and reception terminals.

A possible structure is one in which a check is made to confirm whether a device being authenticated has been revoked due to performing an illegal act in the past. This prevents distribution of contents to illegitimate devices.

Furthermore, in order to prevent an illegal device masquerading as a legitimate device, at least one of the initiator and the responder may include information about itself (for example, a certificate, an IP address, or a device ID) in the payload.

In order to prevent information being tampered with by a hacker, at least one of the initiator and the responder may include a hash value of the destination address segment, the source address segment, the type segment or the payload segment, or a hash value of a combination of these segments, in the payload. Furthermore, a digital signature may be applied to the hash values.

The payload of at least one of the initiator and the responder may include information (port number, content information, content attribute, and so on) necessary for communication after authentication, in order to enable authentication to be performed in response to the rank of copy controlled information.

Note that in order to notify in advance information about contents distribution to commence after authentication, the payload of at least one of the initiator and the responder may include information about the processing ability of the device (for example, whether the device is a decoder, an encoder or a communication interface).

In order to reliably confirm whether the transmission and reception terminals are in the same router, the payload of at least one of the initiator and the responder may include information about the router to which the device is connected (for example, IP address or MAC address).

Although a router that performs processing from a first layer (physical layer) to a third layer (network layer) of an OSI reference model of apparatuses connected to different networks is provided in the embodiments, a bridge that performs processing from a first layer (physical layer) to a second layer (data link layer) may instead be provided.

The embodiments are structured to calculate a CRC code in special CRC mode after secret information has been attached to the end of the communication data, so that an error is always mistakenly recognized in normal CRC mode. However, as long as an error is mistakenly identified, the secret information is not limited to being attached to the end of the communication data. For example, the secret information may be attached at the head of the communication data, or inserted a predetermined number of bits from the head of the communication data. Furthermore, instead of calculating the CRC code after adding the secret information to the communication data, the same effect may be obtained by calculating CRC codes from the communication data in a normal mode, and using a converted CRC code obtained by conversion with use of the secret information.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

INDUSTRIAL APPLICABILITY

The present invention can be used in a contents transmission/distribution system in a home network.

What is claimed is:

1. A transmission/reception system comprising a transmission apparatus, a reception apparatus, and a transfer apparatus, the transfer apparatus being connected to the transmission apparatus and an external apparatus and transferring communication data from the transmission apparatus to the external apparatus, as well as transferring communication data from the external apparatus to the reception apparatus, the transmission apparatus including:

an acquisition unit operable to acquire communication data;

a transmission-side holding unit operable to hold first secret information that is identical to second secret information held by the reception apparatus;

a transmission-side generation unit operable to apply a first code conversion to first calculation data which is acquired communication data with the first secret information and predetermined data attached thereto when the acquired communication data is to be transmitted to the reception apparatus, thereby generating a first check code, and apply the first code conversion to second calculation data which is the acquired communication data with the predetermined data attached thereto when the acquired communication data is to be transmitted to the transfer apparatus, thereby generating a second check code;

a transmission unit operable to transmit the communication data with the generated first check code attached thereto when the acquired communication data is to be transmitted to the reception apparatus, and the reception apparatus including:

a reception-side holding unit operable to hold the second secret information that is identical to the first secret information held by the transmission-side holding unit of the transmission apparatus;

a reception-side reception unit operable to receive the communication data with the check code attached thereto transmitted from either of the transmission apparatus and the transfer apparatus;

a reception-side generation unit operable to apply a second code conversion, which is identical to the first code conversion, to third calculation data which is the communication data with the check code attached thereto and the second secret data inserted therein when the received communication data has been transmitted from the transmission apparatus, thereby generating a third check code, and apply the second code conversion to the received communication data with the check code attached thereto when the received communication data has been transmitted from the transfer apparatus, thereby generating a fourth check code; and a check unit operable to check whether or not an error has occurred in the communication data, based on the check code generated by the reception-side generation unit and the check code received by the reception-side reception unit, and the transfer apparatus including:

a transfer-side reception unit operable to receive communication data with a check code attached thereto, that is transmitted from the transmission apparatus and destined for the external apparatus;

a transfer-side generation unit operable to apply a third code conversion, which is identical to the first code conversion, to the communication data with the check code attached thereto received by the transfer-side reception unit, thereby generating a fifth check code; and a judgment unit operable to judge, based on the generated fifth check code and the check code received by the transfer-side reception unit, whether the communication data with the check code attached thereto is to be discarded or is to be transferred to the external apparatus.

2. The transmission/reception system of claim 1, wherein the communication data includes address information for specifying a destination, address information for specifying a transmission origin, and data to be transmitted.

3. The transmission/reception system of claim 2, wherein the transfer apparatus further includes:

an address information holding unit operable to hold address information of an external apparatus; and a transfer unit operable to, when the held address information is address information for specifying a destination included in the communication data transmitted from the transmission apparatus, transfer the communication data received by the transfer-side reception unit to the external apparatus specified by the address information included in the communication data.

4. A transmission apparatus for transmitting communication data to either of a reception apparatus and a transfer apparatus, the transmission apparatus comprising:

an acquisition unit operable to acquire communication data;

a holding unit operable to hold secret information in common with the reception apparatus;

a code generation unit operable to apply a predetermined code conversion to first calculation data which is acquired communication data with the secret information and predetermined data attached thereto when the acquired communication data is to be transmitted to the reception apparatus, thereby generating a first check code, and apply the predetermined code conversion to second calculation data which is the acquired communication data with the predetermined data attached thereto when the acquired communication data is to be transmitted to the transfer apparatus, thereby generating a second check code; and a transmission unit operable to transmit the communication data with the generated first check code attached thereto when the acquired communication data is to be transmitted to the reception apparatus, and transmit the communication data with the generated second check code attached thereto when the acquired communication data is to be transmitted to the transfer apparatus.

5. The transmission apparatus of claim 4, wherein the communication data includes address information for specifying a destination, address information for specifying a transmission origin, and data to be transmitted.

6. The transmission apparatus of claim 4, wherein the code generation unit generates one of the first check code and the second check code in accordance with the communication data.

7. The transmission apparatus of claim 4, wherein the predetermined code conversion is a code conversion of one of a cyclic redundancy check and a check sum.

8. The transmission apparatus of claim 4, wherein the holding unit, the code generation unit and the transmission unit are structured using an integrated circuit.

9. A reception apparatus that receives communication data from either of a transmission apparatus and a transfer apparatus, comprising:

a holding unit operable to hold secret information in common with the transmission apparatus;

a reception unit operable to receive the communication data with a check code attached thereto from either of the transmission apparatus and the transfer apparatus, a code generation unit operable to apply a predetermined code conversion to calculation data which is the communication data with the check code attached thereto and the secret information inserted therein when received communication data has been transmitted from the transmission apparatus, thereby generating a first check code, and apply the predetermined code conversion to the received communication data with the check code attached thereto when the received communication data has been transmitted from the transfer apparatus, thereby generating a second check code; and a check unit operable to check whether or not an error has occurred in the communication data, based on the check code generated by the code generation unit, and the check code received by the reception unit.

10. The reception apparatus of claim 9, wherein the communication data include address information for specifying a destination, address information for specifying a transmission origin, and data to be transmitted.

11. The reception apparatus of claim 9, wherein the code generation unit generates one of the first check code and the second check code in accordance with the communication data.

12. The reception apparatus of claim 9, wherein the predetermined code conversion is a code conversion of one of a cyclic redundancy check and a check sum.

13. The reception apparatus of claim 9, wherein the holding unit, the reception unit, the code generation unit, and the check unit are structured using an integrated circuit.

14. A transfer apparatus for transferring communication data with a check code attached thereto, the transfer apparatus comprising:
- a storage unit operable to store identification information about a predetermined reception apparatus;
- a reception unit operable to receive the communication data with the check code attached thereto transmitted by a transmission apparatus and destined for a reception apparatus; and
- a transfer unit operable to judge, based on the identification information, whether an error check is to be performed on received communication data, and when an error check is to be performed, perform the error check using the check code and, if an error is not found in the communication data, transfer the communication data to the reception apparatus, and when an error check is not to be performed, transfer the communication data to the reception apparatus without performing the error check.

15. The transfer apparatus of claim 14, wherein the check code attached to the communication data is obtained by the transmission apparatus applying a first code conversion to calculation data which is the communication data with first secret information attached thereto,
the transfer unit includes:
- a code generation sub-unit operable to, when an error check is to be performed, apply a second code conversion, which is identical to the first code conversion, to calculation data which is the communication data with the check code attached thereto and second secret information identical to the first second information inserted therein, thereby generating a check code; and
- a check sub-unit operable to judge whether or not the generated check code and the received check code are identical, and when the check codes are judged to be identical, transfer the communication data, and when the check codes are judged not to be identical, discard the communication data.

16. An integrated circuit for transferring communication data with a check code attached thereto, the integrated circuit comprising:
- a storage unit operable to store identification information about a predetermined reception apparatus;
- a reception unit operable to receive the communication data with the check code attached thereto transmitted by a transmission apparatus and destined for a reception apparatus; and
- a transfer unit operable to judge, based on the identification information, whether an error check is to be performed on received communication data, and when an error check is to be performed, perform the error check using the check code and, if an error is not found in the communication data, transfer the communication data to the reception apparatus, and when an error check is not to be performed, transfer the communication data to the reception apparatus without performing the error check.

17. A transfer apparatus for transferring communication data with a check code attached thereto, the transfer apparatus comprising:
- a holding unit operable to hold second secret information that is identical to first secret information held by a transmission apparatus;
- a storage unit operable to a storage unit operable to store identification information about a predetermined reception apparatus;
- a reception unit operable to receive the communication data with the check code attached thereto transmitted by a transmission apparatus and destined for a reception apparatus, the check code having been obtained by the transmission apparatus applying a first code conversion to first calculation data which is obtained by attaching first secret information and predetermined data to communication data;
- a code generation unit operable to apply a second code conversion which is identical to the first code conversion to second calculation data which is obtained by inserting the second secret information and predetermined data in the communication data with the check code attached thereto, thereby generating converted data, and apply the predetermined code conversion to the generated converted data, thereby generating a check code;
- a check unit operable to check whether or not an error has occurred in the communication data, by comparing the received check code with the generated check code;
- a transfer judgment unit operable to judge, based on the identification information, whether or not the communication data is permitted to be transferred; and
- a transfer unit operable to transfer the communication data when the check unit determines that an error has not occurred and the transfer judgment unit has judged that the communication data is permitted to be transferred.

18. The transfer apparatus of claim 17, wherein:
the holding unit further holds fourth secret information that is identical to third secret information held by the reception apparatus; and
the transfer unit applies the second code conversion to third calculation data which is obtained by inserting the fourth secret information and the predetermined data in the communication data, thereby generating a check code, and transfers the communication data with the generated check code attached thereto to the reception apparatus.

19. An integrated circuit for transferring communication data with a check code attached thereto, the integrated circuit comprising:
- a holding unit operable to hold second secret information that is identical to first secret information held by a transmission apparatus;
- a storage unit operable to a storage unit operable to store identification information about a predetermined reception apparatus;
- a reception unit operable to receive the communication data with the check code attached thereto transmitted by a transmission apparatus and destined for a reception apparatus, the check code having been obtained by the transmission apparatus applying a first code conversion to first calculation data which is obtained by attaching first secret information and predetermined data to communication data;
- a code generation unit operable to apply a second code conversion which is identical to the first code conversion to second calculation data which is obtained by inserting the second secret information and predetermined data in the communication data with the check code attached thereto, thereby generating converted data, and apply the predetermined code conversion to the generated converted data, thereby generating a check code;

a check unit operable to check whether or not an error has occurred in the communication data, by comparing the received check code with the generated check code;

a transfer judgment unit operable to judge, based on the identification information, whether or not the communication data is permitted to be transferred; and a transfer unit operable to transfer the communication data when the check unit determines that an error has not occurred and the transfer judgment unit has judged that the communication data is permitted to be transferred.

* * * * *